(12) United States Patent
Tsuzuki et al.

(10) Patent No.: US 8,504,357 B2
(45) Date of Patent: Aug. 6, 2013

(54) RELATED WORD PRESENTATION DEVICE

(75) Inventors: Takashi Tsuzuki, Osaka (JP); Satoshi Matsuura, Kyoto (JP); Kazutoyo Takata, Osaka (JP)

(73) Assignee: Panasonic Corporation, Osaka (JP)

( * ) Notice: Subject to any disclaimer, the term of this patent is extended or adjusted under 35 U.S.C. 154(b) by 1042 days.

(21) Appl. No.: 12/521,927

(22) PCT Filed: Jul. 30, 2008

(86) PCT No.: PCT/JP2008/002032
§ 371 (c)(1),
(2), (4) Date: Jul. 1, 2009

(87) PCT Pub. No.: WO2009/019830
PCT Pub. Date: Feb. 12, 2009

(65) Prior Publication Data
US 2010/0042405 A1 Feb. 18, 2010

(30) Foreign Application Priority Data
Aug. 3, 2007 (JP) ................................ 2007-203588

(51) Int. Cl.
*G06F 17/21* (2006.01)
(52) U.S. Cl.
USPC ........ 704/10; 725/9; 725/46; 725/45; 725/20; 715/745; 715/200; 707/750; 706/47; 705/7.29; 704/256.1; 704/243; 455/426.1; 455/420; 370/397; 348/734; 348/569; 340/533
(58) Field of Classification Search
USPC .............. 704/10, 256.1, 243; 707/750; 725/9, 725/46, 45, 20; 715/745, 200; 706/47; 705/7.29; 455/426.1, 420; 370/397; 348/734, 569; 340/533
See application file for complete search history.

(56) References Cited

U.S. PATENT DOCUMENTS 4,616,214 A * 10/1986 Naito ............................ 340/533
5,673,264 A * 9/1997 Hamaguchi ................... 370/397
(Continued)

FOREIGN PATENT DOCUMENTS

| JP | 7-56948 | 3/1995 |
| JP | 8-161343 | 6/1996 |

(Continued)

OTHER PUBLICATIONS

Partial English translation of JP 2007-183765.

(Continued)

*Primary Examiner* — Michael Colucci
(74) *Attorney, Agent, or Firm* — Wenderoth, Lind & Ponack, L.L.P.

(57) ABSTRACT

A related word presentation device includes a program information storage unit that stores program information of each program; and an information dividing unit that generates, for each of the attributes of the words included in the program information, at least one group which includes a reference word belonging to the attribute and a set of words which co-occur with the reference word in a program. A degree-of-relevance calculating unit stores attribute-based association dictionaries each of which indicates, for the corresponding attribute of words, (i) the words and (ii) the degrees of relevance between the words calculated based on the frequency of co-occurrence in each of groups. A search condition obtaining unit obtains the search word and the attribute; a substitute word obtaining unit selects substitute words from the attribute-based association dictionary for the obtained attribute; and an output unit presents the selected substitute word.

14 Claims, 22 Drawing Sheets

---

Attribute-based groups (Genre)

Group 1 (Variety/Genre)

Program ID "01": Taro Matsushita/Person's name, Saburo Matsushita/Person's name, Japan/Name of country or place, Guest/Occupation, Talk/Genre Program ID "03": Jiro Matsushita/Person's name, Shiro Matsushita/Person's name, Consultation/Genre, Health/Genre, Information/Genre, Health information/Genre

Group 2 (Talk/Genre)

Program ID "01": Taro Matsushita/Person's name, Variety/Genre, Saburo Matsushita/Person's name, Japan/Name of country or place, Guest/Occupation

Group 3 (Information/Genre)

Program ID "02": Japan/Name of country or place, The Japanese island Hanako Matsushita/Person's name, Jiro Matsushita/Person's name Program ID "03": Jiro Matsushita/Person's name, Variety/Genre, Shiro Matsushita/Person's name, Consultation/Genre, Health/Genre, Health information/Genre

U.S. PATENT DOCUMENTS

| | | | |
|---|---|---|---|
| 6,185,531 B1* | 2/2001 | Schwartz et al. | 704/256.1 |
| 6,246,442 B1* | 6/2001 | Harada et al. | 348/569 |
| 6,463,428 B1* | 10/2002 | Lee et al. | 707/750 |
| 6,513,027 B1* | 1/2003 | Powers et al. | 706/47 |
| 7,321,899 B2 | 1/2008 | Saito et al. | |
| 7,428,023 B2* | 9/2008 | Allen et al. | 348/734 |
| 7,483,921 B2 | 1/2009 | Tsuzuki et al. | |
| 7,599,689 B2* | 10/2009 | Makipaa et al. | 455/426.1 |
| 7,716,696 B2* | 5/2010 | Yamamoto et al. | 725/9 |
| 7,890,976 B2* | 2/2011 | Kim | 725/45 |
| 8,332,890 B2* | 12/2012 | Gusler et al. | 725/45 |
| 8,346,593 B2* | 1/2013 | Fanelli et al. | 705/7.29 |
| 2002/0157096 A1* | 10/2002 | Hane et al. | 725/46 |
| 2003/0014398 A1 | 1/2003 | Ohta et al. | |
| 2003/0121045 A1* | 6/2003 | Cho | 725/90 |
| 2003/0143993 A1* | 7/2003 | Nagaoka | 455/420 |
| 2004/0001087 A1* | 1/2004 | Warmus et al. | 345/745 |
| 2004/0181391 A1* | 9/2004 | Inoue et al. | 704/10 |
| 2005/0010582 A1 | 1/2005 | Saito et al. | |
| 2005/0071746 A1* | 3/2005 | Hart et al. | 715/500.1 |
| 2005/0108001 A1* | 5/2005 | Aarskog | 704/10 |
| 2005/0240957 A1* | 10/2005 | Tsunokawa et al. | 725/20 |
| 2006/0026152 A1* | 2/2006 | Zeng et al. | 707/5 |
| 2006/0106604 A1* | 5/2006 | Okimoto | 704/243 |
| 2006/0167918 A1 | 7/2006 | Tsuzuki et al. | |
| 2006/0206471 A1 | 9/2006 | Tsuzuki et al. | |
| 2006/0282258 A1 | 12/2006 | Tsuzuki et al. | |
| 2008/0016092 A1 | 1/2008 | Saito et al. | |

FOREIGN PATENT DOCUMENTS

| | | |
|---|---|---|
| JP | 9-120401 | 5/1997 |
| JP | 10-334106 | 12/1998 |
| JP | 2003-16089 | 1/2003 |
| JP | 2003-271631 | 9/2003 |
| JP | 2004-21915 | 1/2004 |
| JP | 2004-29906 | 1/2004 |
| JP | 2004-164662 | 6/2004 |
| JP | 2004-355069 | 12/2004 |
| JP | 2005-5900 | 1/2005 |
| JP | 2006-163998 | 6/2006 |
| JP | 2006-164044 | 6/2006 |
| JP | 3917648 | 5/2007 |
| JP | 2007-183765 | 7/2007 |
| WO | 2006/046390 | 5/2006 |
| WO | 2006/073095 | 7/2006 |

OTHER PUBLICATIONS

Full English Machine Translation of JP2007-183765.

International Search Report (in English language) issued Sep. 2, 2008 in International Application No. PCT/JP2008/002032, of which the present application is the National Stage.

First Reply (in English language) in corresponding International Application No. PCT/JP2008/002032.

* cited by examiner

FIG. 1

| Word | Degree of relevance | The number of programs which can be searched out based on related word | The number of overlapping programs | The number of non-overlapping programs |
|---|---|---|---|---|
| News | 0.912952 | 566 | 139 | 427 |
| Weather | 0.888675 | 44 | 41 | 3 |
| Show | 0.768624 | 43 | 38 | 5 |
| Variety | 0.542853 | 1679 | 9 | 1670 |
| Weather | 0.496721 | 30 | 25 | 5 |
| Highlight | 0.486695 | 22 | 22 | 0 |
| Stock | 0.381955 | 39 | 23 | 16 |
| Entertainment | 0.372691 | 314 | 70 | 244 |
| Entertainment News | 0.326082 | 67 | 30 | 37 |
| Horse racing | 0.237483 | 16 | 12 | 4 |

Meta data

| Program ID | Broadcasting date | Broadcasting starting time | Program name | Genre | Cast name | Program outline |
|---|---|---|---|---|---|---|
| 01 | 22/8/2006 | 12:00 | Taro Matsushita hour | Variety | Taro Matsushita, Saburo Matsushita | Taro Matsushita invites well-known Japanese guests and has talks. |
| 02 | 22/8/2006 | 13:00 | The Japanese island around noon | Information | Hanako Matsushita, Jiro Matsushita | Live relay broadcast from places in the Japanese island. |
| 03 | 23/8/2006 | 16:00 | Trust Jiro Matsushita | Variety | Jiro Matsushita, Shiro Matsushita | Jiro Matsushita responds to consultation by viewers. Health information included. |
| : | : | : | : | : | : | : |

Pairs of word and attribute

Taro Matsushita/Person's name, Variety/Genre, Saburo Matsushita/Person's name, Japan/Name of country or place, Guest/Occupation, Talk/Genre Japan/Name of country or place, The Japanese island/Name of country or place, Information/Genre, Hanako Matsushita/Person's name, Jiro Matsushita/Person's name Jiro Matsushita/Person's name, Variety/Genre, Shiro Matsushita/Person's name, Consultation/Genre, Health/Genre, Information/Genre, Health information/Genre

FIG. 4

Attribute-based groups (Genre)

Group 1 (Variety/Genre)

Program ID "01": Taro Matsushita/Person's name, Variety/Genre, Saburo Matsushita /Person's name, Japan /Name of country or place, Guest/Occupation, Talk/Genre Program ID "03": Jiro Matsushita/Person's name, Shiro Matsushita /Person's name, Consultation/Genre, Health/Genre ...

Group 2 (Talk/Genre)

Program ID "01": Taro Matsushita/Person's name, Variety/Genre, Saburo Matsushita /Person's name, Japan /Name of country or place, Guest/Occupation, Talk/Genre

Group 3 (Information/Genre)

Program ID "02": Japan/Name of country or place, The Japanese island /Name of country or place, Information/Genre, Hanako Matsushita/Person's name, Jiro Matsushita/Person's name

FIG. 7

Attribute: Genre

| Word W1 | Word W2 | Degree of relevance |
|---|---|---|
| Taro Matsushita/Person's name | Saburo Matsushita/Person's name | 0.5 |
| Taro Matsushita/Person's name | Jiro Matsushita/Person's name | 0.9 |
| Taro Matsushita/Person's name | Shiro Matsushita/Person's name | 0.8 |
| Taro Matsushita/Person's name | Variety/Genre | 0.4 |
| Taro Matsushita/Person's name | Talk/Genre | 0.5 |
| ... | ... | ... |
| Saburo Matsushita/Person's name | Jiro Matsushita/Person's name | 0.7 |
| ... | ... | ... |

| Attribute: Person's name | | |
|---|---|---|
| Word W1 | Word W2 | Degree of relevance |
| ... | ... | ... |
| Hanako Matsushita/Person's name | Jiro Matsushita/Person's name | 0.5 |
| Hanako Matsushita/Person's name | Shiro Matsushita/Person's name | 0.8 |
| Hanako Matsushita/Person's name | Japan/Name of country or place | 0.2 |
| Hanako Matsushita/Person's name | The Japanese island/Name of country or place | 0.3 |
| Hanako Matsushita/Person's name | Information/Genre | 0.6 |
| ... | ... | ... |

| Japan/Name of country or place | | |
|---|---|---|
| Word W1 | Word W2 | Degree of relevance |
| Taro Matsushita/Person's name | Saburo Matsushita/Person's name | 0.5 |
| Taro Matsushita/Person's name | Hanako Matsushita/Person's name | 0.6 |
| Taro Matsushita/Person's name | Jiro Matsushita/Person's name | 0.6 |
| Taro Matsushita/Person's name | Variety/Genre | 0.4 |
| Taro Matsushita/Person's name | Talk/Genre | 0.5 |
| ... | ... | ... |
| Saburo Matsushita/Person's name | Hanako Matsushita/Person's name | 0.7 |
| ... | ... | ... |

| Word | Degree of relevance | The number of programs which can be searched out based on substitute word | The number of overlapping programs | The number of non-overlapping programs |
|---|---|---|---|---|
| News/Genre | 0.817109 | 566 | 139 | 427 |
| Special/Genre | 0.806336 | 124 | 5 | 119 |
| Travelogue/Genre | 0.572064 | 54 | 1 | 53 |
| History/Genre | 0.545061 | 118 | 2 | 116 |
| Living/Genre | 0.457068 | 236 | 1 | 235 |
| Lifestyle/Genre | 0.445747 | 66 | 0 | 66 |
| Travel/Genre | 0.427208 | 141 | 9 | 132 |
| Health/Genre | 0.426174 | 116 | 0 | 116 |
| Cooking/Genre | 0.423293 | 324 | 1 | 323 |
| Entertainment/Genre | 0.421074 | 16 | 0 | 16 |

FIG. 14

Attribute-based groups (Genre)

Group 1 (Variety/Genre)

Program ID "01"
Taro Matsushita/Person's name, Saburo Matsushita/Person's name, Japan/Name of country or place, Guest/Occupation, Talk/Genre Program ID "03"
Jiro Matsushita/Person's name, Shiro Matsushita/Person's name, Consultation/Genre, Health/Genre, Information/Genre, Health information/Genre

Group 2 (Talk/Genre)

Program ID "01"
Taro Matsushita/Person's name, Variety/Genre, Saburo Matsushita/Person's name, Japan/Name of country or place, Guest/Occupation

Group 3 (Information/Genre)

Program ID "02"
Japan/Name of country or place, The Japanese island/Name of country or place, Hanako Matsushita/Person's name, Jiro Matsushita/Person's name Program ID "03"
Jiro Matsushita/Person's name, Variety/Genre, Shiro Matsushita/Person's name, Consultation/Genre, Health/Genre, Health information/Genre

FIG. 16

| Word W1 | Word W2 | Degree of relevance |
|---|---|---|
| ⋮ | ⋮ | ⋮ |
| Information/Genre | Jiro Matsushita/ Person's name | 0.6 |
| Hanako/Matsushita/ Person's name | Japan/Name of country or place | 0.2 |
| Hanako/Matsushita/ Person's name | The Japanese island/ Name of country or place | 0.3 |
| Hanako/Matsushita/ Person's name | Information/Genre | 0.6 |
| Hanako/Matsushita/ Person's name | Jiro Matsushita/ Person's name | 0.8 |
| Jiro Matsushita/ Person's name | Japan/Name of country or place | 0.3 |
| ⋮ | ⋮ | ⋮ |

List of "Variety" programs

| | | |
|---|---|---|
| Taro Matsushita hour | 22/8/2006 | |
| Taro Matsushita invites well-known Japanese guests and has talks. | | |
| Trust Jiro Matsushita | 23/8/2006 | |
| Jiro Matsushita responds to consultation by viewers. Health information included. | | |
| Satire night | 23/8/2006 | |
| Taro Matsushita satirizes world situations in funny way. | | |

Program ID "01" CB
Program ID "03" CB
Program ID "10" CB

Start — SB

| The number of search results | The number of narrow-down words: The number of substitute words (Word ratio) |
|---|---|
| 1000 or more | 8 : 2 |
| 500 - 1000 | 6 : 4 |
| 50 - 500 | 4 : 6 |
| Below 50 | 2 : 8 |

| Percentage of search results with respect to total number of programs | The number of narrow-down words: The number of substitute words (Word ratio) |
|---|---|
| 1.0 - 0.75 | 8 : 2 |
| 0.75 - 0.5 | 6 : 4 |
| 0.5 - 0.25 | 4 : 6 |
| 0.25 - 0.0 | 2 : 8 |

| The number of search results | The number of narrow-down words | The number of substitute words |
|---|---|---|
| 1000 or more | 8 or less | 2 or less |
| 500 - 1000 | 6 or less | 4 or less |
| 50 - 500 | 4 or less | 6 or less |
| Below 50 | 2 or less | 8 or less |

133a

RELATED WORD PRESENTATION DEVICE

BACKGROUND OF THE INVENTION

1. Technical Field

The present invention relates to related word presentation devices which make association dictionaries composed of electric data, and in particular to a related word presentation device which generates association dictionaries each indicating words related to a predetermined word, and presents, as related words, the words related to the predetermined word using the association dictionary.

2. Background Art

Conventional devices include a program search device which obtains a search word (search condition) from a user and searches a list of television programs for programs associated to the search word.

Other proposed devices include a related word presentation device which presents, to a user, related words related to an inputted search word so that the user can search out a desired sentence (program) by repeatedly inputting search words (for example, see Patent Reference 1).

The user can perform narrow-down search and omission prevention search for programs based on search words by selecting a related word as a new search word from among related words presented by the related word presentation device and inputting the selected word into the program search device.

In other words, the program search device searches out programs associated with the search word inputted by the user and presents the programs as the search results. Here, in the case where the program search device performs narrow-down search upon receiving a next search word inputted by the user, the program search device searches out programs associated with the next search word from among the programs obtained as the search results based on the previously inputted search word. Meanwhile, in the case where the program search device performs omission prevention search upon receiving a next search word inputted by the user, the program search device presents a logical sum of the programs associated with the next search word and the programs associated with the previously inputted search word.

The related word presentation device in Patent Reference 1 presents related words as next search word candidates in order to prevent omission in search (perform omission prevention search) when a small number of search results is obtained based on a search word inputted by the user.

Accordingly, in an exemplary case where a single related word is selected as a next search word from among related words presented by the related word presentation device in Patent Reference 1, the program search device calculates the logical sum of the search word and the previous search word, and repeats search. Here, since the related words presented to the user have close relationships with the search word inputted by the user, the user can obtain search results which gradually increase from the search results obtained first.

Patent Reference 1: Japanese Unexamined Patent Application Publication No. 10-334106

SUMMARY OF THE INVENTION

However, the related word presentation device in Patent Reference 1 has a problem of being not able to allow a program search device to perform appropriate omission prevention search.

In other words, since the conventional related word presentation device presents related words closely associated with a search word, based on co-occurrence relationships in a program, the related word presentation device inevitably displays search results not different from the previous search results so much even when the program search device executes re-search (omission prevention search) based on these related words. In other words, the conventional related word presentation device cannot present related words which can yield desired search results different from the search results obtained through the program search device.

Program information is a list of programs, and shows, for each of programs, the name of the program, the names of cast, the outline of the program and the like, as meta data of the program. The conventional related word presentation device processes the meta data of the program as a single sentence, associates words which co-occur in the program (the meta data), and calculates the degrees of relevance between the words using mutual information and the like.

For example, when a word A and a word B frequently co-occur in a program, a great value is obtained as the degree of relevance between the word A and the word B. In addition, when the word B frequently appears in a program in which the word A does not appear while the word B frequently appears in a program in which the word A appears, a small value is obtained as the degree of relevance between the word A and the word B. To sum up, words having a great degree of relevance with each other are words which frequently co-occur in a program.

FIG. 1 is a diagram showing related words presented by a conventional related word presentation device.

For example, the conventional related word presentation device presents top ten related words having the greatest to tenth-greatest degrees of relevance with a search word "Sports". The related words each having a great degree of relevance with the search word "Sports" are words which frequently co-occur in news programs and sport programs.

However, since each of the related words has been calculated as having a great degree of relevance with the search word "Sports" based on the co-occurrence relationship within each program, a great number of programs in which the search word "Sports" appears overlaps with the programs in which each related word appears. For example, the number of programs which can be searched out based on a related word "Weather" is forty-four, and as many as forty-one programs among the forty-four programs can be searched out based on the search word "Sports". Accordingly, even when the program search device searches out programs based on the search word "Sports" and further performs omission prevention search using the related word "Weather" as a next search word, the current results are not different so much from the previous results, that is, only three programs are different.

As for ten related words shown in FIG. 1, the half or more of the programs which can be searched out based on the related words (six, in this example) overlap with the programs which can be also searched out based on the search word "Sports".

In other words, when the conventional related word presentation device presents related words each having a great degree of relevance with a search word in preparation for the case where the user is not satisfied with the search results obtained using the search word, it is often that the results of re-search based on the related words are not different so much from the search results based on the previous search words.

Here, it is assumed that the conventional related word presentation device makes, in advance, association dictionaries indicating the degrees of relevance between words. In other words, the related word presentation device includes an association dictionary making device which makes dictionaries indicating the degrees of relevance between the words.

However, since the association dictionary making device in the conventional related word presentation device makes association dictionaries by calculating the degrees of relevance between words based on the co-occurrence relationships in each program as described earlier, the association dictionary making device is incapable of allowing the program search device to perform appropriate omission prevention search.

The present invention has been made in view of this problem, and has an object to provide a related word presentation device which is capable of allowing a program search device to perform appropriate omission prevention search.

In order to achieve the above object, a related word presentation device according to an aspect of the present invention makes association dictionaries each including words and degrees of relevance between the words, and includes: a program information storage unit configured to store program information indicating, for each of programs, contents of the program using words; a classifying unit configured to make, for each of attributes of reference words each of which is a word included in the program information, at least one group as a unit including (i) a corresponding one of the reference words and (ii) a set of words which co-occur with the corresponding one of the reference words in a program including the corresponding one of the reference words; a first degree-of-relevance calculating unit configured to store the association dictionaries for the respective attributes ,the association dictionaries each including (i) a possible pair of words in a corresponding one of the attributes of the words and (ii) the degree of relevance between the words in the possible pair calculated based on the number of groups included in the corresponding one of the attributes of the words, the groups in the attributes of the words being classified based on presence or absence of the possible pair of words; an obtaining unit configured to obtain a search word and an attribute of the search word; a first related word selecting unit configured to select, as a first related word, a word related to the search word obtained by the obtaining unit from a corresponding association dictionary for the attribute obtained by the obtaining unit from among the association dictionaries for the respective attributes; and a presenting unit configured to present the first related word selected by the first related word selecting unit.

In addition, the first degree-of-relevance calculating unit may be configured to calculate the degree of relevance between the words in the possible pair according to the frequency of co-occurrence of the words in the possible pair in each of the groups generated by the classifying unit, and make the association dictionary which indicates the possible pair of words and the degree of relevance between the words in the possible pair in an associated manner. In addition, the first related word selecting unit may be configured to preferentially select a word having the greatest degree of relevance with the search word obtained by the obtaining unit as the first related word from the association dictionary for the attribute obtained by the obtaining unit.

With this, in the related word presentation device according to the present invention, the words included in the program information are classified into groups based on their attributes such as Genre and Person's name, the degrees of relevance between the words are calculated based on the co-occurrence relationships in the to groups, and association dictionaries are made. Here, each of the groups corresponding to an attribute is composed for each reference word which is a word belonging to the attribute and present in the program information, and the group is a set of words which co-occur with the reference word in a program in the program information. Accordingly, each of the association dictionaries for the respective attributes made in this way indicates the degrees of relevance between the words calculated based on the co-occurrence relationships in the groups as described above, instead of the degrees of relevance between the words calculable based on the co-occurrence relationships in the programs as conventional. In other words, the degrees of relevance are calculated based on not co-occurrence relationships in a frame of a program but the co-occurrence relationships in a frame of a set of words which co-occur with the reference words, that is, a set of words which has a common usage or meaning.

As a result, for example, it is possible to increase the degree of relevance between the words which appear in a program and frequently co-occur with a word (reference word) even when these words appear in separate programs, compared to the degree of relevance between the words which co-occur only within a program. Further, it is possible to increase the degree of relevance between the words which appear in different programs and frequently co-occur with the word (reference word) when the words which do not co-occur in a program has the frequency of co-occurrence with the word (reference word) which is greater than the frequency of co-occurrence of the words in the program.

In this way, in the related word presentation device according to the present invention, the words each having a great degree of relevance with the search word are selected as the first related words (substitute words) from the association dictionary for the attribute of the search word and are presented, thereby preventing overlaps between the programs including the search word and the programs including the first related words. In other words, the program search device can display many programs each of which is different from the previous search results and has an appropriate relevancy by displaying the search results by searching out the programs corresponding to the search word, selecting, as the next search word, one of the first related words presented by the related word presentation device according to the present invention, and performing omission prevention search.

In addition, the related word presentation device may further include: a degree-of-relevance calculating unit configured to calculate the degree of relevance between the possible pair of words according to frequency of co-occurrence of the possible pair of words in each program indicated in the program information, make the program association dictionary which indicates the possible pair of words and the degree of relevance between the words in the possible pair in an associated manner, and store the association dictionary in a dictionary storage unit; and a second related word selecting unit configured to preferentially select a word having the greatest degree of relevance with the search word obtained by the obtaining unit as a second related word from the corresponding one of the program association dictionaries stored in the dictionary storage unit, wherein the presenting unit may be configured to further present the second so related word selected by the second related word selecting unit.

In this way, program association dictionaries indicating the degrees of relevance between the words calculated based on the co-occurrence relationships in a program are also generated, and the words each having a great degree of relevance with the search word are selected as the second related words (narrow-down words) from the program association dictionaries and are presented. As a result, the program search device can appropriately narrow down the previous search results by searching the programs corresponding to the search word, displays the search results, selecting, as the next search word, the second related words presented by the related word presentation device according to the present invention, and executing narrow-down search.

In addition, the related word presentation device may further include a program selecting unit configured to identify programs selected by the user from among the programs indicated in the program information, wherein the obtaining unit may be configured to obtain a single word as the search word from among the words according to the frequency of appearance of the words used in the program information to show the contents of the programs identified by the program selecting unit.

When programs are selected by the user in this way, a search word is predicted from the programs, the related word presentation device can present the first related words without receiving a direct input of the search word from the user. In other words, the user can cause it to present the first related words by selecting an attractive program even when the user does not have a specific search word.

In addition, the first related word selecting unit may be configured to select, as the first related word, only a word having an attribute identical to an attribute of the search word obtained by the obtaining unit.

With this, it is possible to present, as the first related words, only the words belonging to the attribute which has been currently focused on by the user. Therefore, the user can easily select the next search word among the presented first related words.

In addition, the first related word selecting unit may be configured to further select a word having a greater degree of relevance with the other search word as a third related word from the association dictionary for the attribute of an other search word in the case where the other search word and the attribute of the other search word have been obtained in a predetermined period prior to the obtainment of the search word by the obtaining unit, and the presentation unit may further present the third related word obtained by the first related word selecting unit.

With this, the third related words for the past search words (other search words) are also presented in addition to the first related words for the recent search words, the user can easily select, as the next search word, the related words for the more attractive search word.

In addition, the second related word selecting unit may be configured to select, as the second related word, only the word having an attribute different from the attribute of the search word obtained by the obtaining unit.

With this, since only the words each having an attribute different from the attribute of the search word are presented as the second related words (narrow-down words), the user can perform narrow-down search in an aspect different from the aspect of the previous search word by selecting, as the next search word, one of the second related words. For example, all the attributes of these are different from the attribute of the search word when plural second related words are presented. Therefore, the user can easily select the next search word from among the second related words when attempting narrow-down search in an aspect different from the aspect of the search result.

In addition, the related word presentation device may further include a search unit configured to search out, from the program information, a program whose contents are shown using the search word obtained by the obtaining unit, wherein the first and second related word selecting units may select first related words and second related words, respectively, and the presenting unit may be configured to present a greater number of the second related words than the first related words when a greater number of programs is searched out by the search unit, and present a greater number of the first related words than the second related words when a smaller number of programs is searched out by the search unit.

With this, a greater number of second related words (narrow-down words) is presented when a greater number of programs is searched out. Therefore, when many programs are displayed as the search results by the program search device, the user can easily select the next search word to narrow down the search results from among the presented first and second related words. In addition, a greater number of first related words (substitute words) is presented when a smaller number of programs is searched out. Therefore, when few programs are displayed as the search results by the program search device, the user can easily select the next search word to increase the search results from among the presented first and second related words. In other words, the user can easily select, as the next search word, an appropriate search word according to the state of the search results.

It is to be noted that the present invention can be implemented not only as the related word presentation device like this, but also a method for making dictionaries used in the device, a method for presenting related words, a program causing a computer to execute these methods, a computer-readable recording medium in which these programs are stored, and an integrated circuit.

The related word presentation device according to the present invention provides an advantageous effect of allowing a program search device to perform appropriate omission prevention search by presenting related words associated with a search word so that a great number of programs different from the programs in which the search word is included can be searched out.

BRIEF DESCRIPTION OF DRAWINGS

FIG. 1 is a diagram showing related words presented by a conventional related word presentation device.

FIG. 3 is a diagram showing an example of program information in the Embodiment.

FIG. 4 is a diagram showing the state where pairs of a word and its attribute which are associated with programs are classified into groups including words belonging to an attribute "Genre" in the Embodiment.

FIG. 7 is a diagram showing an example of an attribute-based association dictionary for an attribute A in the Embodiment.

FIG. 8 is a diagram showing an example of an attribute-based association dictionary for an attribute B in the Embodiment.

FIG. 9 is a diagram showing an example of an attribute-based association dictionary for an attribute C in the Embodiment.

FIG. 13 is a diagram illustrating an advantageous effect in the Embodiment.

FIG. 14 is a diagram indicating an exemplary state where pairs of a word and its attribute which are associated with programs are classified into groups including words belonging to the attribute "Genre" in the Embodiment.

FIG. 16 is a diagram showing an exemplary program association dictionary in Variation 1 of the Embodiment.

FIG. 19 is a diagram showing a display screen displayed on a program selecting unit in Variation 2 of the Embodiment.

FIG. 21 is a diagram showing an exemplary word ratio table in Variation 3 of the Embodiment.

FIG. 22 is a diagram showing an exemplary word ratio table in Variation 3 of the Embodiment.

FIG. 23 is a diagram showing an exemplary word ratio table in Variation 3 of the Embodiment.

Figure 2:
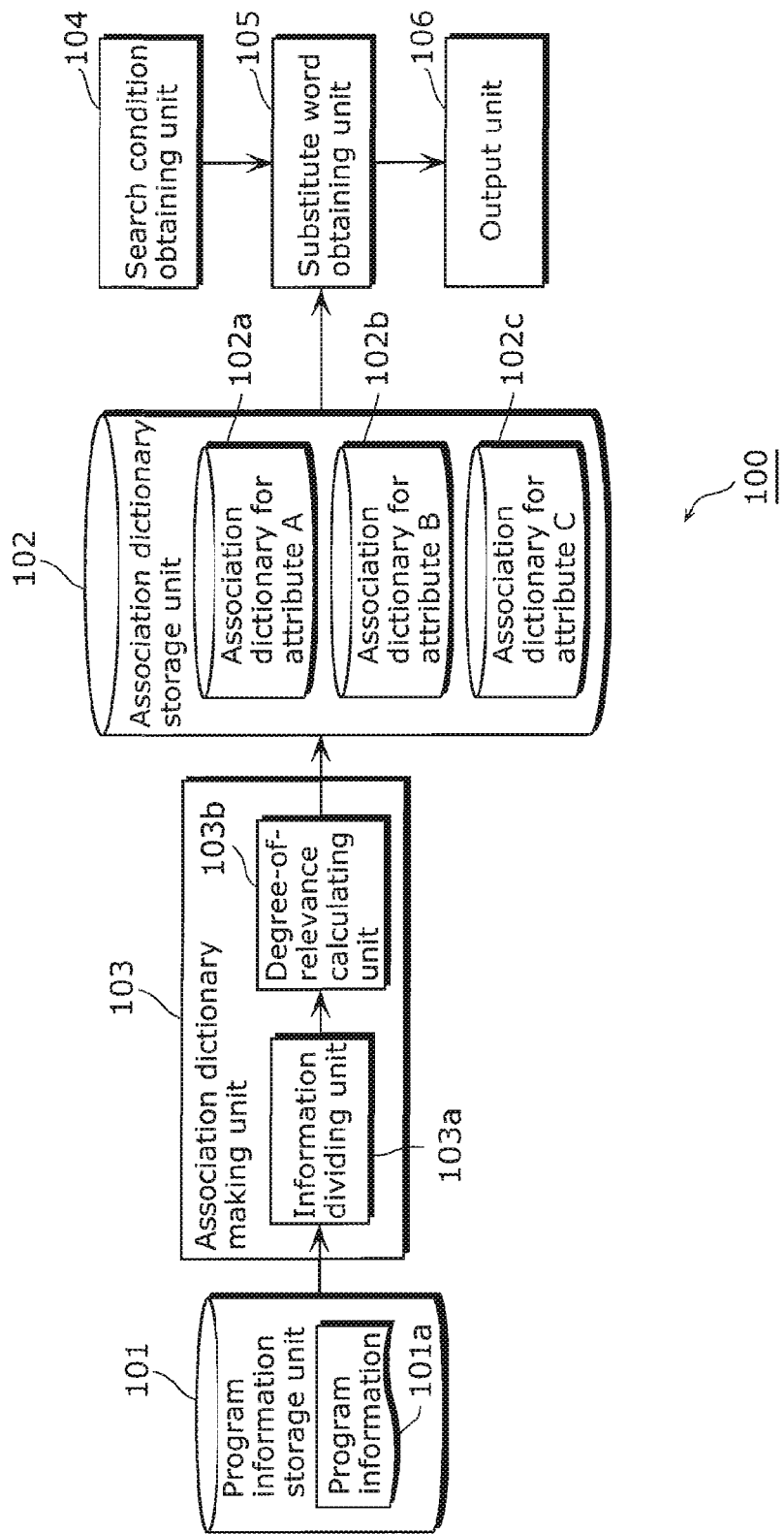
FIG. 2 is a block diagram showing the structure of a related word presentation device according to an Embodiment of the present invention.

NUMERICAL REFERENCES 100, 100a, 100b, 100c Related word presentation device
101 Program information storage unit
101a Program information
102 Association dictionary storage unit
102a Attribute-based association dictionary for an attribute A
102b Attribute-based association dictionary for an attribute B
102c Attribute-based association dictionary for an attribute C
102d Program association dictionary
103, 113 Association dictionary making unit
103a Information dividing unit
103b Degree-of-relevance calculating unit
103c Program association dictionary making unit
104, 104a Search condition obtaining unit
105 Substitute word obtaining unit
106, 132 Output unit
111 Narrow-down word obtaining unit
121 Program selecting unit
131 Search unit
133 Table storage unit
133a Word ratio table

DETAILED DESCRIPTION OF THE INVENTION

A related word presentation device according to an embodiment of the present invention is described below with reference to the drawings.

FIG. 2 is a block diagram showing the structure of a related word presentation device according to an embodiment of the present invention.

The related word presentation device 100 is a device which presents a related word associated with a search word in order to allow a program search device to perform appropriate omission prevention search, and includes a program information storage unit 101, an association dictionary storage unit 102, an association dictionary making unit 103, a search condition obtaining unit 104, a substitute word obtaining unit 105, and an output unit 106, as shown in FIG. 2.

The program information storage unit 101 stores program information 101a showing a list of programs.

The association dictionary making unit 103 makes attribute-based association dictionaries (an attribute-based association dictionary for an attribute A 102a, an attribute-based association dictionary for an attribute B 102b, and an attribute-based association dictionary for an attribute C 102c) each indicating, based on each of the attributes of words included in program information 101a, the words included in the program information 101a and the degrees of relevance between the words, and stores these attribute-based association dictionaries into the association dictionary storage unit 102. It is to be noted that the attribute-based a association dictionary for an attribute A 102a, the attribute-based association dictionary for an attribute B 102b, and the attribute-based association dictionary for an attribute C 102c are referred to attribute-based association dictionaries as a whole.

In addition, attributes are information other than program names and are used to classify the respective words. Examples of attributes include: an attribute "Adjectival phrases" to which words "Perfect", "Special" and the like belong; an attribute "Genre" to which words "News", "Documentary" and the like belong; an attribute "Occupation" to which words "Announcer", "Director" and the like belong; an attribute "Name of country or place" to which "the United States", "Fushimi-inari shrine" belong; and an attribute "Person's name" to which words "Jiro Matsushita", "Taro Matsushita" and the like belong.

The association dictionary making unit 103 includes an information dividing unit 103a and a degree-of-relevance calculating unit 103b.

The information dividing unit 103a divides words included in the program information 101a into groups based on the attributes of the words included in the program information 101a. In other words, based on the attribute of each word included in the program information 101a, the information dividing unit 103a makes, as word groups, sets of words which co-occur, in a program, with a reference word belonging to the attribute of the word included in the program information 101a.

The degree-of-relevance calculating unit 103b calculates, for the attributes of the respective words included in the program information 101a, the degrees of relevance between words in each of possible pairs based on the frequencies of co-occurrence of the words in each possible pair in each of the groups generated by the information dividing unit 103a. In addition, the degree-of-relevance calculating unit 103b calculates degrees of relevance between the words, makes attribute-based association dictionaries indicating the associations between the words and the degrees of relevance in an associated manner, and stores the attribute-based association dictionaries into the association dictionary storage unit 102.

The search condition obtaining unit 104 obtains a word (search word) which is a search condition and the attribute of the word in response to an input operation by a user. This search condition obtaining unit 104 is structured with input devices such as keyboards, a mouse, and a remote controller.

The substitute word obtaining unit 105 obtains, as a substitute word (related word), a word related to the search word obtained by the search condition obtaining unit 104 from the attribute-based association dictionary for the attribute of the search word held in the association dictionary storage unit 102.

The output unit 106 presents, to the user, the substitute word obtained by the substitute word obtaining unit 105. This output unit 106 includes a display unit such as a CRT display, a liquid crystal display (LCD), and a plasma display (PDP).

It is to be noted that, in this Embodiment, the association dictionary making device is composed of the program information storage unit 101 and the association dictionary making unit 103. In addition, in this Embodiment, the information dividing unit 103a is structured as a classifying unit, and the degree-of-relevance calculating unit 103b is structured as a first degree-of-relevance calculating unit and storage unit. Further, in this Embodiment, the association dictionary storage unit 102 is structured as a dictionary storage unit, the search condition obtaining unit 104 is structured as an obtaining unit, the substitute word obtaining unit 105 is structured as the first related word selecting unit which selects the substitute word (the first related word), and the output unit 106 is structured as a presenting unit which presents the substitute word (the first related word).

FIG. 3 is a diagram showing an example of the program information 101a.

As shown in FIG. 3, the program information 101a includes, for each program, a program ID which is an identifier identifying the program, meta data indicating the contents of the program, and pairs of a word and the attribute of the word included in the meta data of the program.

The program ID is represented as, for example, "01, 02, 03, . . . " and assigned to a corresponding program.

In addition, meta data includes broadcasting date on which the program is to be broadcast, broadcasting starting time at which broadcast of the program is started, the program name, the genre of the program, cast names indicating the names of cast, and program outline explaining the outline of the program.

For example, the program information 101a includes a program ID "01" and meta data associated with the program ID "01". The meta data includes: the broadcasting date "22 Aug. 2006"; the broadcasting starting time "12:00", the Program name "Taro Matsushita hour", the Genre "Variety", the Cast names "Taro Matsushita, and Saburo Matsushita", and the Program outline "Taro Matsushita invites well-known Japanese guests and has talks". The program information 101a further includes a program ID "02" and meta data associated with the program ID "02". The meta data includes: the broadcasting date "22 Aug. 2006"; the broadcasting starting time "13:00", the Program name "The Japanese island around noon", the Genre "Information", the Cast names "Hanako Matsushita, and Jiro Matsushita", and the Program outline "Live relay broadcast from places in the Japanese island". The program information 101a further includes a program ID "03" and meta data associated with the program ID "03". The meta data includes: the broadcasting date "23 Aug. 2006", the broadcasting starting time "16:00"; the Program name "Trust Jiro Matsushita", the Genre "Variety", the Cast names "Jiro Matsushita, and Shiro Matsushita", and the Program outline "Jiro Matsushita responds to consultation by viewers. Health information included".

Further, for example, the program information 101a includes, in association with the program ID "01", pairs of a word and its attribute which are "Taro Matsushita/Person's name, Variety/Genre, Saburo Matsushita/Person's name, Japan/Name of country or place, Guest/Occupation, and Talk/Genre". It is to be noted that the word and the attribute of the word are represented in form of "(word)/(attribute)" using "/" as a delimiter. For example, in the case of "Taro Matsushita/Person's name", "Taro Matsushita" is the word, and "Person's name" is the attribute of the word "Taro Matsushita".

In addition, the program information 101a includes, in association with the program ID "02", pairs of a word and its attribute which are "Japan/Name of country or place, The Japanese island/Name of country or place, Information/Genre, Hanako Matsushita/Person's name, and Jiro Matsushita/Person's name". >In addition, the program information 101a includes, in association with the program ID "03", pairs of a word and its attribute of "Jiro Matsushita/Person's name, Variety/Genre, Shiro Matsushita/Person's name", Consultation/Genre, Health/Genre, Information/Genre, and Health information/Genre".

Here, for example, the words and the attributes thereof in the pairs may be included in the above-described program information 101a by being extracted from the meta data using a unique expression extraction technique, a morpheme analysis technique, or the like.

The information dividing unit 103a of the association dictionary making unit 103 classifies the pairs of a word and its attribute associated with each program (program ID) included in the program information 101a into groups corresponding to the respective words (reference words) belonging to the attributes (Genre, Person's name, Name of country or place, and the like) of the words indicated by the program information 101a. In other words, the information dividing unit 103a classifies, for each attribute, words which co-occur with the word (reference word) belonging to the attribute in at least one program (associated with pairs of a word and its attribute) into a single group.

FIG. 4 is a diagram showing the state where pairs of a word and its attribute which are associated with programs are classified into groups for groups corresponding to the respective words belonging to the attribute "Genre".

For example, a pair of a word and its attribute associated with the program ID "01" and a pair of a word and its attribute associated with the program ID "03" include the word "Variety" belonging to the attribute "Genre", the information dividing unit 103a classifies these pairs into Group 1 corresponding to "Variety/Genre". In addition, the pair of a word and its attribute associated with the program ID "01" includes a word "Talk" belonging to the attribute "Genre", the information dividing unit 103a classifies the pair into Group 2 corresponding to "Talk/Genre" Further, a pair of a word and its attribute associated with the program ID "02" includes a word "Information" belonging to the attribute "Genre", the information dividing unit 103a classifies the pair into Group 3 corresponding to "Information/Genre".

In other words, as for the attribute "Genre", the information dividing unit 103a classifies, into Group 1, the words which co-occur with the reference word "Variety" belonging to the attribute "Genre" in the programs (associated with pairs of a word and its attribute), classifies, into Group 2, the words which co-occur with the reference word "Talk" belonging to the attribute "Genre" in the program (associated with pairs of a word and its attribute), and classifies, into Group 3, the words which co-occur with the reference word "Information" belonging to the attribute "Genre" in the program (associated with pairs of a word and its attribute).

Here, in this Embodiment, the information dividing unit 103a classifies words included in the pairs of a word and its attribute into the Groups such that a word is not repeatedly classified into a Group when classifying the pairs into the Groups. For example, the information dividing unit 103a classifies the pairs of a word and its attribute associated with the program ID "01" into Group 1 first, and then classifies the pairs of a word and its attribute associated with the program ID "03" into Group 1. At this time, since the word "Variety" among the words included in the pairs of a word and its attribute associated with the program ID "03" has already been classified into Group 1, the information dividing unit 103a classifies, into Group 1, the remaining words other than the word "Variety" among the words included in the pairs of a word and its attribute associated with the program ID "03".

Figure 5:
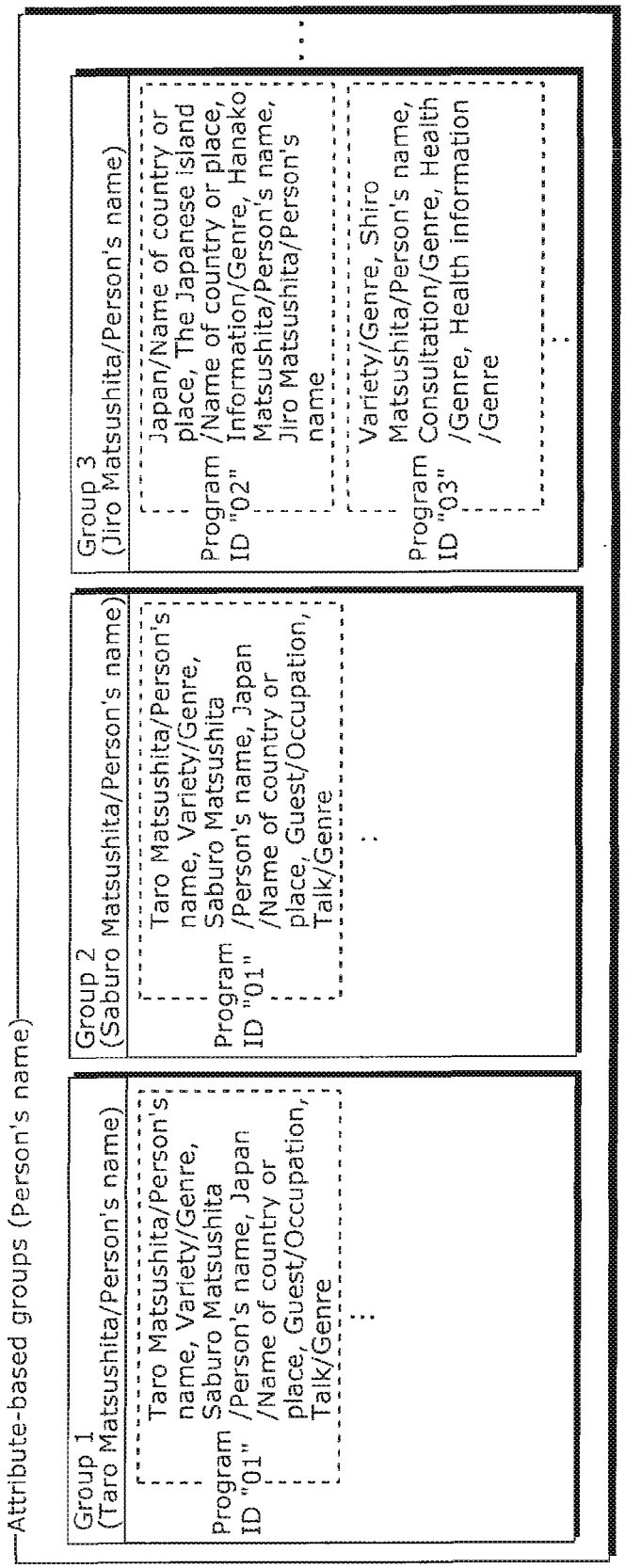
FIG. 5 is a diagram showing the state where pairs of a word and its attribute which are associated with programs are classified into groups including words belonging to an attribute "Person's name" in the Embodiment.

FIG. 5 is a diagram showing the state where pairs of a word and its attribute associated with programs are classified into groups corresponding to the respective words belonging to the attribute "Person's name" in the Embodiment.

For examples, since a pair of a word and its attribute associated with the program ID "01" includes a word "Taro Matsushita" belonging to the attribute "Person's name", the information dividing unit 103a classifies the pair into Group 1 corresponding to "Taro Matsushita/Person's name". In addition, since a pair of a word and its attribute associated with the program ID "01" includes a word "Saburo Matsushita" belonging to the attribute "Person's name", the information dividing unit 103a classifies the pair into Group 2 corresponding to "Saburo Matsushita/Person's name". Further, since a pair of a word and its attribute associated with the program ID "02" and the program ID "03" includes a word "Jiro Matsushita" belonging to the attribute "Person's name", the information dividing unit 103a classifies the pair into Group 3 corresponding to "Jiro Matsushita/Person's name".

In other words, as for the attribute "Person's name", the information dividing unit 103a classifies, into Group 1, the words which co-occur with the reference word "Taro Matsushita" belonging to the attribute "Person's name" in the program (associated with pairs of a word and its attribute), classifies, into Group 2, the words which co-occur with the reference word "Saburo Matsushita" belonging to the attribute "Person's name" in the program (associated with pairs of a word and its attribute), and classifies, into Group 3, the words which co-occur with the reference word "Jiro Matsushita" belonging to the attribute "Person's name" in the programs (associated with pairs of a word and its attribute).

Figure 6:
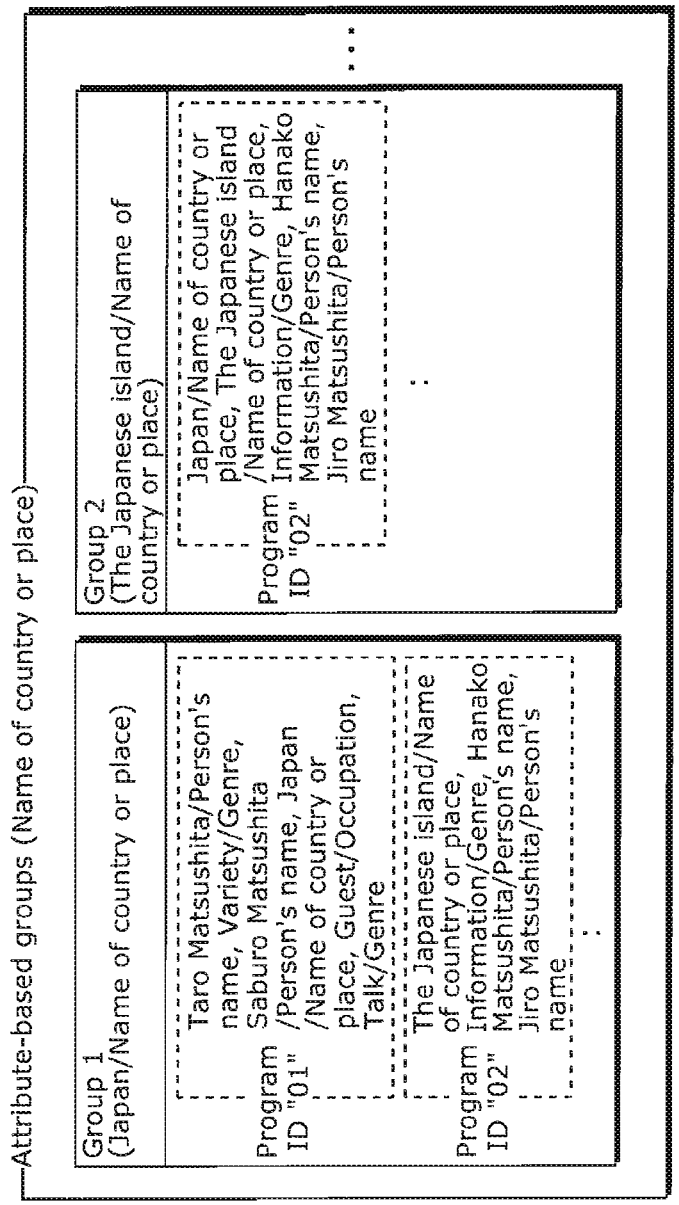
FIG. 6 is a diagram showing the state where pairs of a word and its attribute which are associated with programs are classified into groups including words belonging to an attribute "Name of country or place" in the Embodiment.

FIG. 6 is a diagram showing the state where pairs of a word and its attribute which are associated with programs are classified into groups corresponding to the respective words for an attribute "Name of country or place".

For example, since a pair of a word and its attribute associated with the program ID "01" and a pair of a word and its attribute associated with the program ID "02" include the word "Japan" belonging to the attribute "Name of country or place", the information dividing unit 103a classifies these pairs into Group 1 corresponding to "Japan/Name of country or place". In addition, since a pair of a word and its attribute associated with the program ID "02" includes the word "The Japanese island" belonging to the attribute "Name of country or place, the information dividing unit 103a classifies the pair into Group 2.

In other words, as for the attribute "Name of country or place", the information dividing unit 103a classifies, into Group 1, the words which co-occur with the reference word "Japan" belonging to the attribute "Name of country or place" in the programs (associated with pairs of a word and its attribute), and classifies, into Group 2, the words which co-occur with the reference word "The Japanese island" belonging to the attribute "Name of country or place" in the program (associated with pairs of a word and its attribute).

These groups made based on each attribute by such classifications are hereinafter referred to as attribute-based groups.

The information dividing unit 103a classifies words included in the respective pairs of a word and its attribute such that a word is not repeatedly classified into a group in this Embodiment, but it is to be noted that a word may be repeatedly classified into a group. In this case, in the classification of pairs of a word and its attribute into groups, the information dividing unit 103a classifies all words included in each word attribute into a group without checking whether each word has already been classified into the group.

The degree-of-relevance calculating unit 103b of the association dictionary making unit 103 calculates, for the respective attribute-based groups (based on attributes), the degrees of relevance between the respective words included in the attribute-based groups, and makes attribute-based association dictionaries for the attribute-based groups.

In other words, in the making of an attribute-based association dictionary, the degree-of-relevance calculating unit 103b calculates the degrees of relevance between the words in each possible pair included in each attribute-based group. Subsequently, the degree-of-relevance calculating unit 103b makes the attribute-based dictionary for indicating the association between the two words included in the pair and the degrees of relevance calculated for the words, and stores the attribute-based dictionary in the association dictionary storage unit 102.

For example, the degree-of-relevance calculating unit 103b calculates the degrees of relevance between words using mutual information (MI). More specifically, the degree-of-relevance calculating unit 103b calculates the mutual information (MI) as a degree of relevance using MI=log 2 (aN/((a+b)(a+c)) where the number of groups including both a word W1 and a word W2 is "a", the number of groups not including the word W1 but including the word W2 is "b", the number of groups including the word W1 but not including the word W2 is "c", the number of groups neither including the word W1 nor the word W2 is "d", and the total number of groups is "N" (=a+b+c+d).

It is to be noted that the degree-of-relevance calculating unit 103b may calculate the degrees of relevance according to a general method using a dice-coefficient, a weighted dice-coefficient, a t-score, an X square value, or a log likelihood ratio instead of the mutual information (MI).

The degree of relevance between a word W1 and a word W2 is a value which becomes greater with an increase in the number of groups in which the word W1 and the word W2 co-occur in the attribute-based groups. For example, the degree of relevance is small when the word W2 is included both in many of the groups including the word W1 and in many of the groups not including the word W1. In other words, a great degree of relevance between words shows that the words co-occur in many groups and are closely related to each other.

For example, as shown in FIG. 4, the degree-of-relevance calculating unit 103b calculates the degree of relevance between the word "Taro Matsushita" and the word "Saburo Matsushita", the degree of relevance between the word "Taro Matsushita" and the word "Variety", the degree of relevance between the word "Taro Matsushita" and the word "Talk", or the like which are included in the attribute-based groups for the attribute "Genre". As a result, the degree-of-relevance calculating unit 103b makes an attribute-based association dictionary for an attribute A 102a indicating the degrees of relevance between the words in the respective attribute-based groups for the attribute "Genre".

FIG. 7 is a diagram showing an example of the attribute-based association dictionary for an attribute A 102*a*.

The attribute-based association dictionary for an attribute A 102*a* indicates the degrees of relevance between pairs of words which indicates, for example, the names of the cast and the genre of a program and are included in the attribute-based groups corresponding to the attribute "Genre" in an associated manner.

More specifically, the attribute-based association dictionary for an attribute A 102*a* indicates the degree of relevance 0.5 between a word W1 "Taro Matsushita" and a word W2 "Saburo Matsushita", the degree of relevance 0.4 between the word W1 "Taro Matsushita" and a word W2 "Variety", and the degree of relevance 0.5 between the word W1 "Taro Matsushita" and a word W2 "Talk".

It is noted that the attribute-based association dictionary for an attribute A 102*a* also indicates the attributes of the respective words. In addition, the two words in each possible pair whose degree of relevance is indicated in the attribute-based association dictionary for an attribute A 102*a* are words included in a group.

In addition, the degree-of-relevance calculating unit 103*b* calculates the degree of relevance between the word "Hanako Matsushita" and the word "Jiro Matsushita", the degree of relevance between the word "Hanako Matsushita" and the word "Japan", the degree of relevance between the word "Hanako Matsushita" and the word "Information", and the like which are included in the attribute-based groups for the attribute "Person's name" as shown in FIG. 5. As a result, the degree-of-relevance calculating unit 103*b* makes an attribute-based association dictionary for an attribute B 102*b* indicating the degrees of relevance between words in attribute-based groups for the attribute "Person's name".

FIG. 8 is a diagram showing an example of the attribute-based association dictionary for an attribute B 102*b*.

The attribute-based association dictionary for an attribute B 102*b* indicates the degrees of relevance between words which indicate, for example, the names of the cast and the genre of a program, and are included in the attribute-based groups corresponding to the attribute "Person's name" in an associated manner.

More specifically, the attribute-based association dictionary for an attribute B 102*b* indicates the degree of relevance 0.5 between a word W1 "Hanako Matsushita" and a word W2 "Jiro Matsushita", the degree of relevance 0.2 between the word W1 "Hanako Matsushita" and a word W2 "Japan", and the degree of relevance 0.6 between a word W1 "Hanako Matsushita" and a word W2 "Information".

It is noted that the attribute-based association dictionary for an attribute B 102*b* also indicates the attributes of the respective words. In addition, the two words in each possible pair whose degrees of relevance are indicated in the attribute-based association dictionary for an attribute B 102*b* are words included in a group.

In addition, the degree-of-relevance calculating unit 103*b* calculates the degree of relevance between the word "Taro Matsushita" and the word "Saburo Matsushita" the degree of relevance between the word "Taro Matsushita" and the word "Variety", the degree of relevance between the word "Taro Matsushita" and the word "Talk", and the like included in the attribute-based groups for the attribute "Name of country or place" as shown in FIG. 6. As a result, the degree-of-relevance calculating unit 103*b* makes an attribute-based association dictionary 102*c* indicating the degrees of relevance between the respective words in the attribute-based groups for the attribute "Name of country or place".

FIG. 9 is a diagram showing an example of the attribute-based association dictionary for an attribute C 102*c*.

The attribute-based association dictionary for an attribute C 102*c* indicates the degrees of relevance between words which indicate, for example, the names of the cast and the genre of a program, and are included in the attribute-based groups corresponding to the attribute "Names of country or place" in an associated manner.

More specifically, the attribute-based association dictionary for an attribute C 102*c* indicates the degree of relevance 0.5 between a word W1 "Taro Matsushita" and a word W2 "Saburo Matsushita", the degree of relevance 0.4 between the word W1 "Taro Matsushita" and a word W2 "Variety", and the degree of relevance 0.5 between the word W1 "Taro Matsushita" and a word W2 "Talk".

It is to be noted that the attribute-based association dictionary for an attribute C 102*c* also indicates the attributes of the respective words. In addition, the two words in each possible pair whose degrees of relevance are indicated in the attribute-based association dictionary for an attribute C 102*c* are words included in a group.

In addition, the attribute-based association dictionaries for the attributes "Genre", "Person's name", and "Name of country or place" are made in the Embodiment, but it is to be noted that other attribute-based association dictionaries for other attributes may be made. For example, attribute-based association dictionaries may be made for the following attributes: "Team name" or "Sport name" related to sports such as professional baseball and football; "Orchestra name" related to symphony orchestras or the like; "Committee name" or "Organization name" related to committees, organizations or the like; "Occupation name" related to occupations such as an announcer, or a baseball player; and "Modifiers" related to modifiers such as "strong" and "extremely-low-priced". In addition, an attribute-based association dictionary may be made not for the attribute "Person's name" but for its sub-attributes, for example, "Character name", "Main character", and "Supporting player" of a drama or the like.

The substitute word obtaining unit 105 searches out the attribute-based association dictionary for the attribute obtained by the search condition obtaining unit 104 from the association dictionary storage unit 102. Further, the substitute word obtaining unit 105 searches out, from the attribute-based association dictionary, the words each having a degree of relevance which is not less than a threshold value with the search word obtained by the search condition obtaining unit 104, and obtains these words as substitute words (related words). In other words, the substitute word obtaining unit 105 selects words as substitute words (related words) from the attribute-based association dictionary for the attribute obtained by the search condition obtaining unit 104 in an ascending order of magnitude of the degrees of relevance with respect to the search word obtained by the search condition obtaining unit 104. Subsequently, the substitute word obtaining unit 105 causes the output unit 106 to present the obtained substitute words.

Figure 10:
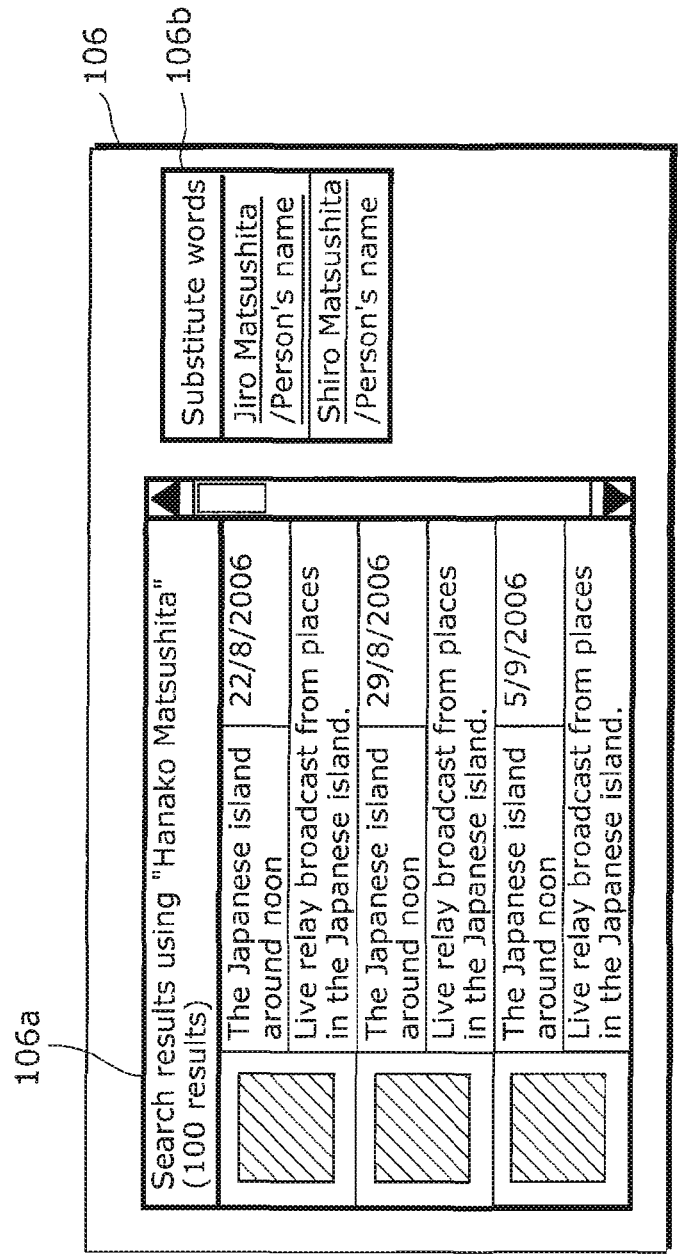
FIG. 10 is a diagram showing the contents presented by an output unit in the Embodiment.

FIG. 10 is a diagram showing the contents presented by the output unit 106.

For example, the output unit 106 is connected to a program search device, and displays the program searched out by the program search device and the above-mentioned substitute words. It is to be noted that the program search device searches out programs based on the search word inputted by the user from among the programs indicated in the program information 101a stored in the program information storage unit 101.

The output unit 106 displays a search result display screen 106a indicating a list of the programs searched out by the program search device and a substitute word display screen 106b indicating the substitute words.

For example, "Jiro Matsushita/Person's name", "Shiro Matsushita/Person's name" and the like are displayed on the substitute word display screen 106b as substitute words and the attributes thereof.

Figure 11:
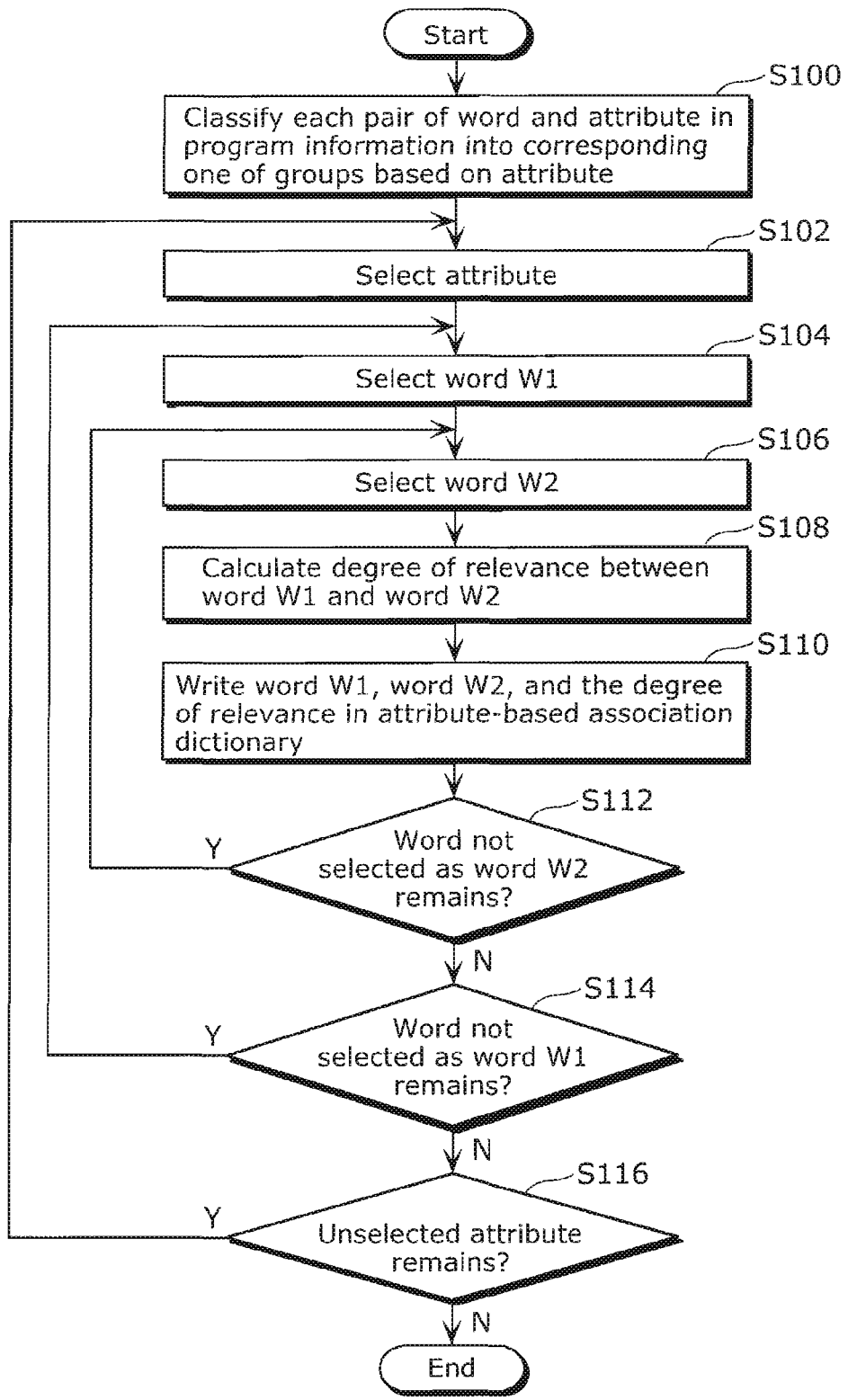
FIG. 11 is a flowchart indicating operations of the associated dictionary making unit in the Embodiment.

FIG. 11 is a flowchart indicating operations of the association dictionary making unit 103.

The information classifies the respective pairs of a word and its attribute in the program information 101a into groups (Step S100). In other words, the information dividing unit 103a classifies, for each attribute, each word which co-occurs with the word (reference word) belonging to the attribute in the pairs of a word and its attribute included in the program information 101a stored in the program information storage unit 101 into the group corresponding to the attribute and reference word. In the case where plural words (reference words) belong to the attribute, the number of groups to be made is equal to the number of reference words. As a result, the attribute-based groups are made for each attribute.

For example, in the case where the reference word "Variety" belonging to the attribute "Genre" is included in the pairs of a word and its attribute of the program information 101a as shown in FIG. 4, the information dividing unit 103a classifies the words "Taro Matsushita, Variety, Saburo Matsushita, etc." which co-occur with the reference word "Variety" in the pairs of a word and its attribute into Group 1 corresponding to the "Variety/Genre". Further, in the case where the program information 101a includes other words (Information, Consultation, Health, Health information, and the like) belonging to the attribute "Genre" in addition to the reference word "Variety" belonging to the attribute "Genre", the information dividing unit 103a classifies the word which co-occur with the reference word in the pairs into the group corresponding to the reference word. In addition, in the case where the program information 101a includes words belonging to other attributes (such as Person's name and Name of country or place), the information dividing unit 103a also performs the above-described classifications.

Next, the degree-of-relevance calculating unit 103b selects a single attribute (attribute-based groups) from among the attributes used for classifications by the information dividing unit 103a (Step S102), selects a single word W1 included in the attribute-based groups (Step S104), and selects a single word W2 included in the attribute-based groups (Step S106).

Subsequently, the degree-of-relevance calculating unit 103b calculates the degree of relevance between the word W1 selected in Step S104 and the word W2 selected in Step S106, based on the attribute (attribute-based groups) selected in Step S102. Subsequently, the degree-of-relevance calculating unit 103b writes the words W1 and W2 and the degree of relevance between the words W1 and W2 in an associated manner in the attribute-based association dictionary corresponding to the attribute (Step S110).

For example, the degree-of-relevance calculating unit 103b selects the attribute "Genre" from among the attributes (Genre, Person's name, Name of country or place, and the like) of the words included in the program information 101a, and calculates the degree of relevance between the word W1 "Taro Matsushita/Person's name" and the word W2 "Variety/Genre" with reference to the attribute-based groups of the attribute. As a result, the data of Taro Matsushita/Person's name, Variety/Genre, and 0.4 is written in the attribute-based association dictionary for an attribute A 102a as an exemplary data of a word W1, a word W2, and the degree of relevance.

The degree-of-relevance calculating unit 103b determines whether or not the attribute-based groups include a word which has not yet selected as a word W2 (Step S112). Here, when the degree-of-relevance calculating unit 103b determines that a word to be selected is left (Y in Step S112), it repeatedly executes the processing starting from Step S106. In other words, the degree-of-relevance calculating unit 103b selects the word to be selected as a new word W2.

Meanwhile, when the degree-of-relevance calculating unit 103b determines that no word to be selected is left (N in Step S112), it further determines whether or not the attribute-based groups include a word which has not yet selected as a word W1 (Step S114). Here, the degree-of-relevance calculating unit 103b determines that a word to be selected is left (Y in Step S114), it repeatedly executes the processing with Step S104. In other words, the degree-of-relevance calculating unit 103b selects the word to be selected as a new word W1.

In addition, when the degree-of-relevance calculating unit 103b determines that no word to be selected is left (N in Step S114), it determines that the attribute-based association dictionary for the attribute selected in Step S102 has been completed, and determines whether or not an attribute to be selected is left among the attributes (attribute-based groups) used for the classifications by the information dividing unit 103a (Step S116).

When the degree-of-relevance calculating unit 103b determines that an attribute to be selected is left (Y in Step S116), it repeatedly executes the processing starting from Step S102. Meanwhile, when the degree-of-relevance calculating unit 103b determines that no attribute to be selected is left (N in Step S116), it determines that all attribute-based association dictionaries have been completed, and terminates the processing.

Next, a description is given of how the related word presentation device 100 according to the Embodiment operates to obtain substitute words from attribute-based association dictionaries.

Figure 12:
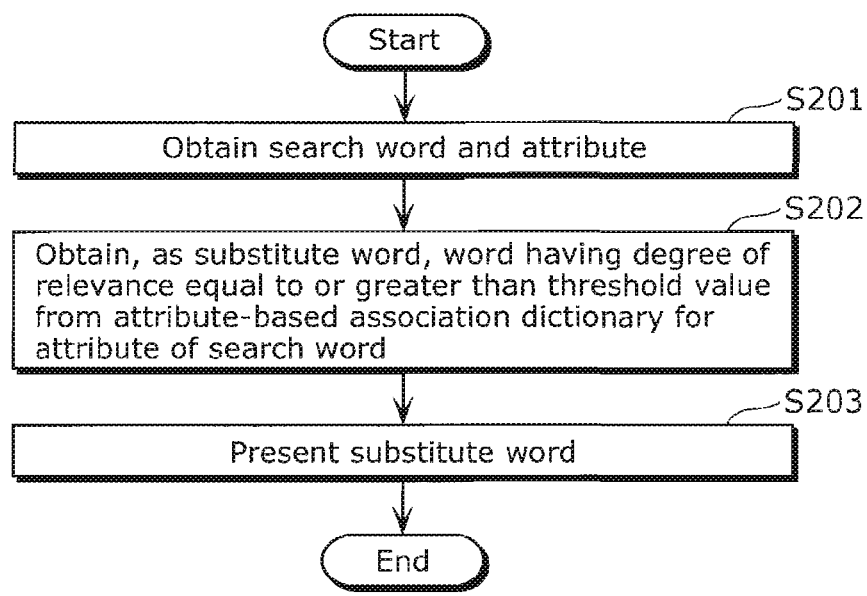
FIG. 12 is a flowchart indicating how the related word presentation device performs operations of presenting substitute words related to a search word inputted by a user in the Embodiment.

FIG. 12 is a flowchart indicating how the related word presentation device 100 operates to present substitute words related to a search word inputted by a user.

First, in response to an input operation by the user, the search condition obtaining unit 104 obtains the search word and the attribute thereof and outputs them to the substitute word obtaining unit 105 (Step S201). The substitute word obtaining unit 105 obtains, as substitute words (related words), the words having a degree of relevance not less than a threshold value with the search word from the attribute-based association dictionary corresponding to the attribute (Step S202).

For example, the search condition obtaining unit 104 obtains "Hanako Matsushita/Person's name" as a search word/an attribute. Here, the association dictionary storage unit 102 stores attribute-based association dictionaries as shown in FIG. 7 to FIG. 9. In this case, the substitute word obtaining unit 105 obtains, as substitute words, the words "Jiro, Matsushita", "Shiro Matsushita", and "Information" each having a degree of relevance not less than the threshold (for example, 0.5) with the search word "Hanako Matsushita", from the attribute-based association dictionary for an attribute B 102b corresponding to the attribute "Person's name".

It is to be noted that the substitute word obtaining unit 105 may obtain, as substitute words, a predetermined number of words selected in an ascending order of magnitude of the degrees of relevance with the search word instead of obtaining, as substitute words, the words having a degree of relevance not less than the threshold value with the search word. In addition, the substitute word obtaining unit 105 obtains substitute words from the attribute-based association dictionary corresponding to the attribute obtained by the search condition obtaining unit 104, but it may obtain substitute words from all attribute-based association dictionaries.

Next, the output unit 106 presents, to the user, the substitute words obtained by the substitute word obtaining unit 105 (Step S203). For example, the output unit 106 presents, to the user, the substitute words "Jiro Matsushita", "Shiro Matsushita", and "Information" obtained by the substitute word obtaining unit 105. It is to be noted that the output unit 106 may present, to the user, the attributes of the substitute words in addition to the substitute words.

As described above, in this Embodiment, groups corresponding to the respective reference words are made assuming that the respective words belonging to corresponding ones of attributes included in meta data of the program information 101a are reference words, and the words included in the meta data of the program information 101a are respectively classified into the corresponding groups. Further, in this Embodiment, the degrees of relevance between the words which co-occur in each group are calculated for each attribute. This makes it possible to strengthen the association between the words which (i) appear in a program and (ii) co-occur with a word (reference word) when respectively appear in different programs such that the association between the words becomes greater than the association between words which are associated only based on co-occurrence in a program. Further, in the case of a pair of words which co-occur only within a program but seldom appear, the words may be associated more weakly than a pair of words which do not co-occur in a program but often co-occur in a group.

As a result, when the program search device executes re-search (omission prevention search) using the substitute words presented by the related word presentation device 100 in this Embodiment after search based on a search word, the program search device can display appropriate search results with a reduced number of overlaps with the previous search results (a list of programs) and are attractive to the user.

FIG. 13 is a diagram for illustrating an advantageous effect in this Embodiment.

For example, the association dictionary making unit 103 in this Embodiment handles, as the program information 101a, an electric program table as a list of approximately 10,000 programs which are to be broadcast during three months through six channels of the ground wave, and makes attribute-based association dictionaries using the electric program table. As shown in FIG. 13, an attribute-based association dictionary made in this way shows top ten words having the greatest to tenth-greatest degrees of relevance with respect to a corresponding one of words and attributes of "Sports/Genre".

In other words, after receiving "Sports/Genre" as the search word and the attribute, the related word presentation device 100 presents, as substitute words, the top ten words having the greatest to tenth-greatest degrees of relevance with respect to the search word as shown in FIG. 13.

Here, since the presented substitute words each has a great degree of relevance with respect to the search word "Sports" calculated based on the co-occurrence relationship in the group, it is possible to reduce the number of overlaps of the programs to be searched out based on the search word "Sports' and the programs to be searched out based on each of the substitute words.

For example, the number of programs searched out based on a substitute word ESpecial" is one hundred and twenty-four, and only five among them overlaps with the programs searched out based on the word "Sports".

In other words, the related word presentation device 100 in this Embodiment is capable of presenting, to a user, substitute words which appear in programs different form the programs according to the search condition (search word) inputted by the user and often co-occur with a specific word (reference word) in a group. These substitute words have meanings similar to that of the search word because of the similarity in usage.

Accordingly, in the case where the program search device searches out programs based on the search word "Sport" and further performs omission prevention search based on a substitute word "Special", it is possible to display many new programs (one hundred and nineteen programs) not included in the previous search results.

In other words, the program search device can display new search results with a reduced number of overlaps with the previous search results and perform appropriate omission prevention search by performing omission prevention search using the related words presented by the related word presentation device 100.

It is to be noted that the information dividing unit 103a may classify, for each of attributes, words which co-occur with words (reference words) belonging to the respective attributes into groups without including the reference words in the groups.

FIG. 14 is a diagram indicating an exemplary state where pairs of a word and its attribute respectively associated with programs are classified into groups including words belonging to the attribute "Genre".

For example, a pair of a word and its attribute of the program ID "01" and a pair of word and its attribute of the program ID "03" include a word "Variety" belonging to the attribute "Genre", the information dividing unit 103a classifies these pairs into Group 1 corresponding to "Variety/Genre". In addition, a pair of a word and its attribute of the program ID "01" includes a word "Talk" belonging to the attribute "Genre" the information dividing unit 103a classifies the pair into Group 2 corresponding to "Talk/Genre". Further, a pair of a word and its attribute of the program ID "02" and a pair of a word and its attribute of the program ID "03" include a word "Information" belonging to the attribute "Genre", the information dividing unit 103a classifies these pairs into Group 3 corresponding to "Information/Genre".

Here, as described above, the information dividing unit 103a removes the reference words in the groups from the pairs of a word and its attribute when classifying the pairs into the groups, that is, classifies the pairs without reference words into the groups. For example, the information dividing unit 103a removes the reference word "Variety" of Group 1 from the pairs of a word and its attribute associated with the program ID "01," and the pairs of a word and its attribute associated with the program ID "03" when classifying the pairs of a word and its attribute into Group 1, removes the reference word "Talk" of Group 2 from the pairs of a word and its attribute associated with the program ID "01" when classifying the pairs of a word and its attribute into Group 2, removes the reference word "Information" of Group 3 from the pairs of a word and its attribute associated with the program ID "02" and the pairs of a word and its attribute associated with the program ID "03" into Group 3 when classifying the pairs of a word and its attribute.

Classifying pairs of a word and its attribute without reference words into groups in this way makes it possible to reduce the number of co-occurrence of words which co-occur directly. As a result, it becomes possible to strengthen the association between the words which respectively appear in different programs but co-occur with a word (reference word).

(Variation 1)

Here, Variation 1 of this Embodiment is described.

The related word presentation device according to this Variation presents not only related words (substitute words) for omission prevention search but also related words (narrow-down words) for narrow-down search. In other words, the associated dictionary making unit according to this Variation makes not only attribute-based association dictionaries for substitute words and program association dictionaries for narrow-down words.

Figure 15:
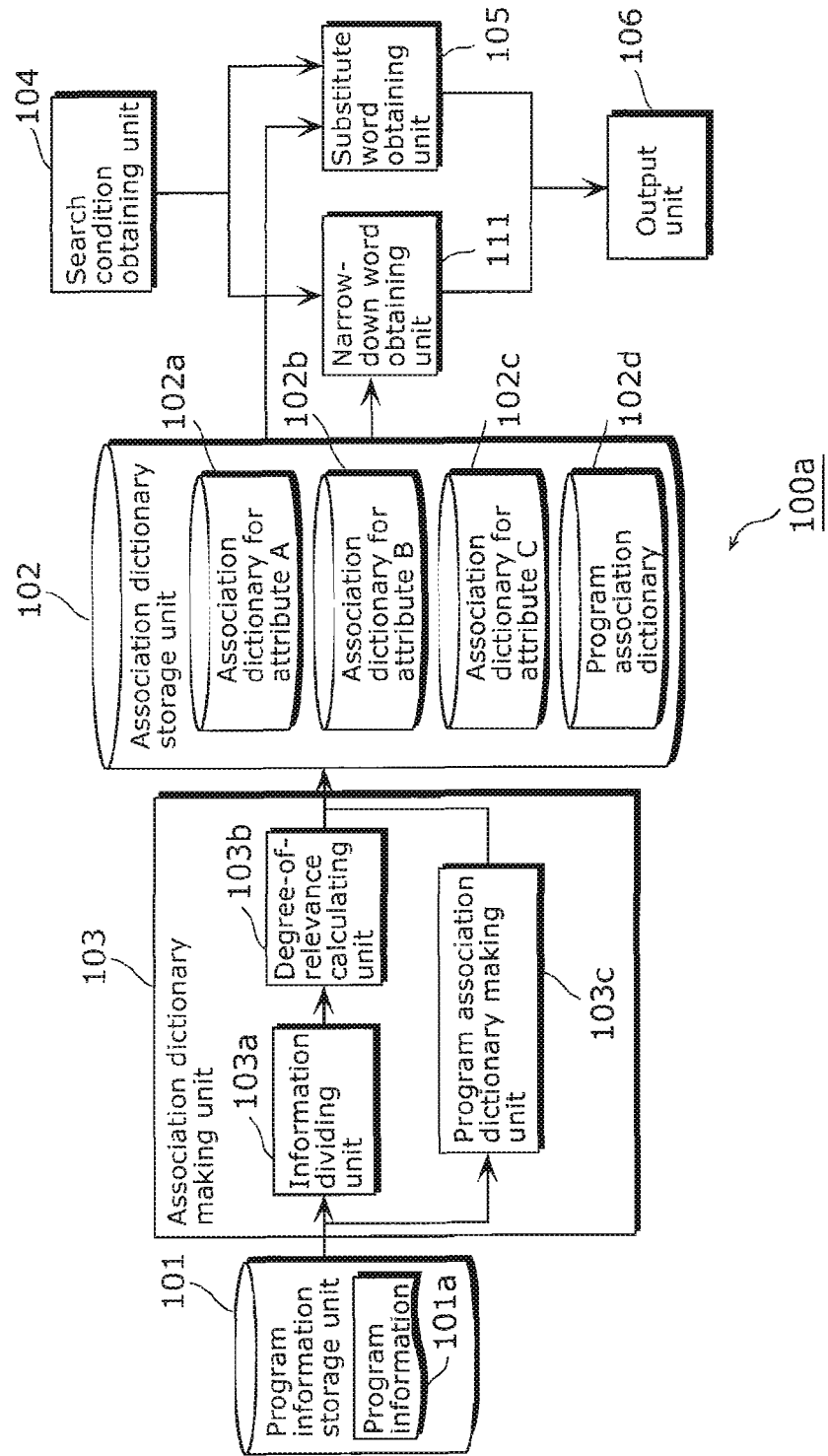
FIG. 15 is a block diagram showing the structure of a related word presentation device in Variation 1 of the Embodiment.

FIG. 15 is a block diagram showing the structure of the related word presentation device in this Variation.

The related word presentation device 100a according to this Variation includes: a program information storage unit 101, an association dictionary making unit 113, an association dictionary storage unit 102, a search condition obtaining unit 104, a narrow-down word obtaining unit 111, a substitute word obtaining unit 105, and an output unit 106.

In other words, the related word presentation device 100a according to this Variation includes an association dictionary making unit 113 instead of the association dictionary making unit 103, compared with the related word presentation device 100 in the above-described Embodiment, and further includes a narrow-down word obtaining unit 111. In addition, the associated dictionary storage unit 102 according to this Variation stores a program association dictionary 102d for narrow-down words, in addition to the attribute-based association dictionaries (the attribute-based association dictionary for an attribute A 102a, the attribute-based association dictionary for an attribute B 102b, and the attribute-based association dictionary for an attribute C 102c).

The association dictionary making unit 113 not only includes the association dictionary making unit 103 in the Embodiment, but also includes the information dividing unit 103a and the degree-of-relevance calculating unit 103b, and further includes the program association dictionary making unit 103c.

The program association dictionary making unit 103c calculates the degrees of relevance between the words in each possible pair included in the meta data of programs using the meta data of the respective programs included in the program information 101a of the program information storage unit 101. Subsequently, the program association dictionary making unit 103c makes the program association dictionary 102d indicating the respective pairs of words and the degrees of relevance between the respective pairs in an associated manner, and stores the program association dictionary 102d in the association dictionary storage unit 102.

In other words, the program association dictionary making unit 103c according to this Variation handles the respective meta data included in the program information 101a as groups included in one of the attribute-based groups, and calculates the degrees of relevance according to the same calculating method (such as mutual information) as the calculating method used by the degree-of-relevance calculating unit 103b.

The narrow-down word obtaining unit 111 obtains, as narrow-down words, from the program association dictionary 102d, the words each having a degree of relevance not less than a threshold value with the search word obtained by the search condition obtaining unit 104. Subsequently, the output unit 106 presents, to the user, the substitute words obtained by the substitute word obtaining unit 105 and the narrow-down words obtained by the narrow-down word obtaining unit 111.

FIG. 16 is a diagram showing an example of the program association dictionary 102d.

For example, as shown in FIG. 16, the program association dictionary 102d indicates the associations between words which co-occur in a program. More specifically, the program association dictionary 102d indicates: the degree of relevance "0.6" between a word W1 "Information" and a word W2 "Jiro Matsushita"; the degree of relevance "0.2" between a word W1 "Hanako Matsushita" and a word W2 "Japan"; and the degree of relevance "0.8" between the word W1 "Hanako Matsushita" and the word W2 "Jiro Matsushita". It is to be noted that the program association dictionary 102d indicates the attributes of the respective words.

For example, when the search condition obtaining unit 104 obtains "Hanako Matsushita/Person's name" as the search word and the attribute, the narrow-down word obtaining unit 111 obtains, as the narrow-down words, the words "Information" and "Jiro Matsushita" having a degree of relevance with the search word not less than a threshold value (for example, 0.6). The output unit 106 presents, to the user, the narrow-down words "Information" and "Jiro Matsushita" obtained by the narrow-down word obtaining unit 111. It is to be noted that the output unit 106 may present, to the user, the attributes of the narrow-down words together with the narrow-down words.

Figure 17:
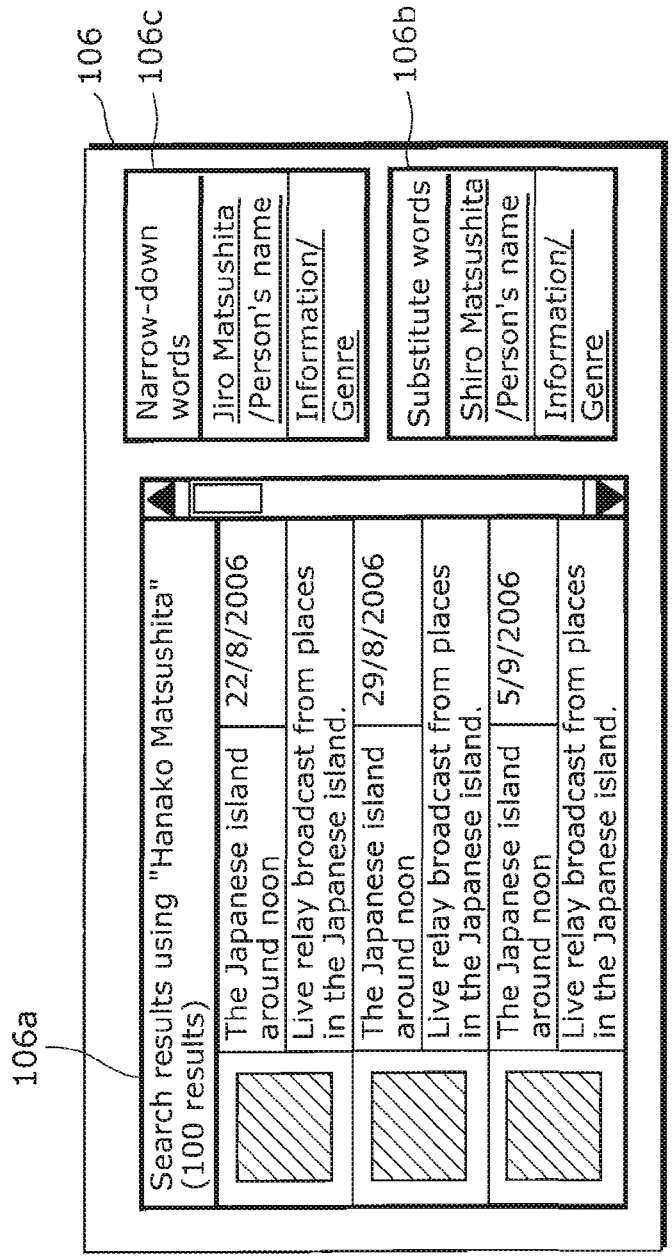
FIG. 17 is a diagram showing the contents presented by an output unit in Variation 1 of the Embodiment.

FIG. 17 is a diagram showing the contents presented by the output unit 106.

For example, the output unit 106 is connected to a program search device, and displays the programs searched out by the program search device and the above-mentioned substitute words and narrow-down words. It is to be noted that the program search device searches out programs corresponding to the search word inputted by the user from among the programs indicated in the program information 101a stored in the program information storage unit 101.

The output unit 106 displays the search result display screen 106a indicating a list of the programs searched out by the program search device, the narrow-down word display screen 106c indicating the narrow down words, and the substitute word display screen 106b indicating the substitute words.

For example, the narrow-down word display screen 106c displays "Jiro Matsushita/Person's name" and "Information/Genre" as the narrow-down words and the attributes. In addition, the substitute word display screen 106b displays "Shiro Matsushita/Person's name" and "Information/Genre" as the substitute words and the attributes thereof.

When one of the substitute words displayed on the substitute word display screen 106b is selected, the program search device executes omission prevention search for programs based on the substitute word. Meanwhile, one of the narrow-down words displayed on the substitute word display screen 106c is selected, the program search device executes narrow-down search for programs based on the narrow-down word.

In this Variation, the program association dictionary making unit 103c structured as the second degree-of-relevance calculating unit calculates the degrees of relevance between words based on the frequencies of co-occurrence between the words in the respective programs indicated by the program information 101a, and stores the program association dictionary 102d in the association dictionary storage unit 102. Further, in this Variation, the narrow-down word obtaining unit 111 structured as the second degree-of-relevance selecting unit selects the words as the narrow-down words (the second related words) from the program association dictionary 102d stored in the association dictionary storage unit 102 in a manner that the words are preferentially selected in an ascending order of magnitude of the degrees of relevance with the search word obtained by the search condition obtaining unit 104.

Accordingly, in this Variation, the program association dictionary 102d indicating great degrees of relevance between words which co-occur in many programs, and words each having a great degree of relevance with the search word are extracted as the narrow-down words from the program association dictionary 102d and displayed.

As a result, the use of the related word presentation device 100a according to this Variation allows the program search device to narrow down the search results (a list of programs) obtained based on the search condition (search word). In addition, since the narrow-down words presented by the related word presentation device 100a are words each having great relevancy with the search word which co-occur in many programs, it is possible to gradually narrow down the search results and prevent a drastic decrease in the so number of search results.

It is to be noted that the narrow-down word obtaining unit 111 may obtain a predetermined number of words as narrow-down words in an ascending order of magnitude of the degrees of relevance with the search word, without obtaining, as narrow-down words, the words each having a degree of relevance with the search word not less than the threshold value.

In addition, the output unit 106 presents, to the user, both the narrow-down words and the substitute words, but the output unit 106 may present, to the user, only one of these according to a user operation.

(Variation 2)

Here, Variation 2 of this Embodiment is described.

The related word presentation device according to this Variation estimates a search word and the attribute thereof based on a program selected by the user without directly obtaining the search word and the attribute thereof from the user.

Figure 18:
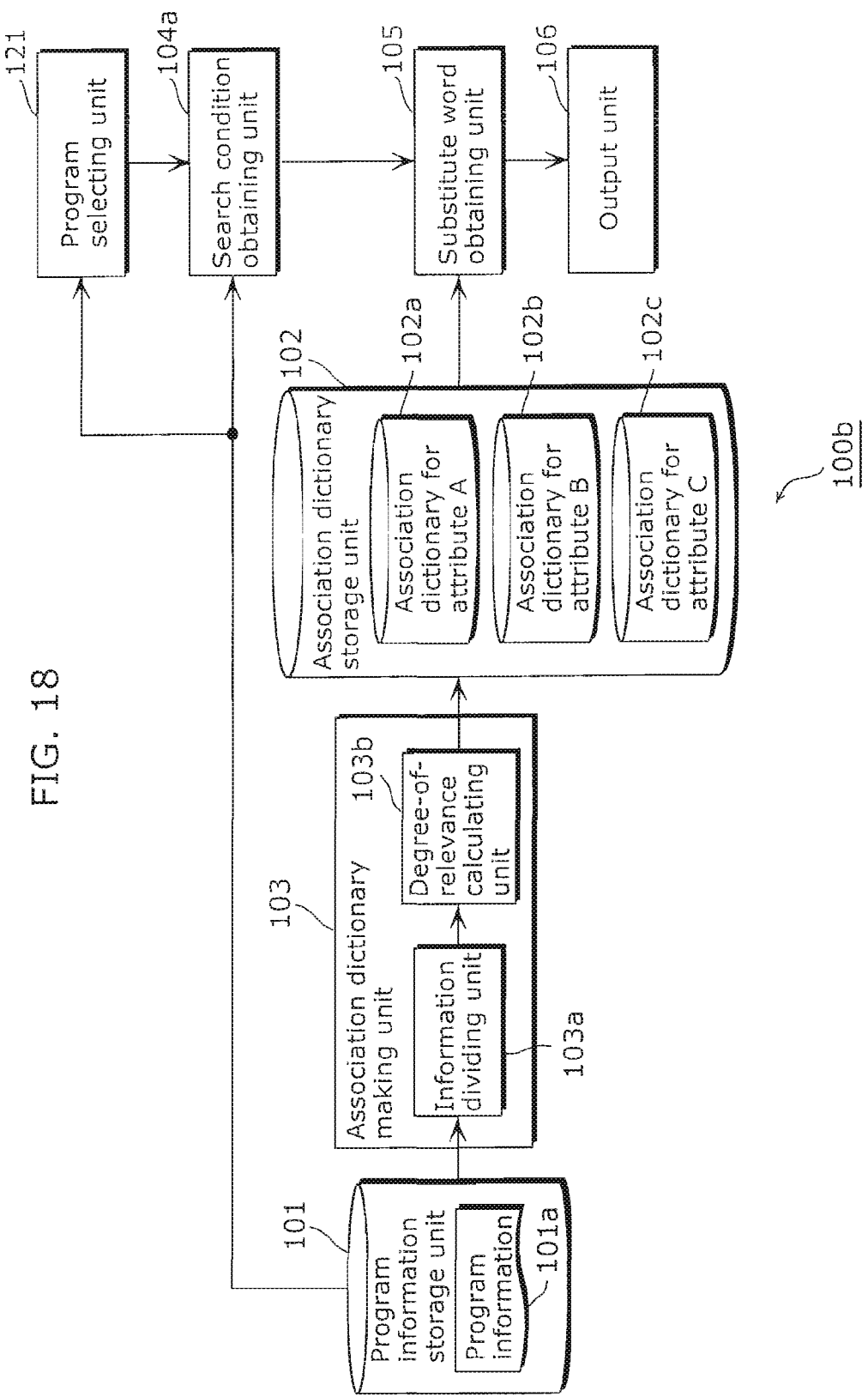
FIG. 18 is a block diagram showing the structure of a related word presentation device in Variation 2 of the Embodiment.

FIG. 18 is a block diagram showing the structure of the related word presentation device in this Variation.

The related word presentation device 100b according to this Variation includes, a program information storage unit 101, an association dictionary making unit 103, an association dictionary storage unit 102, a program selecting unit 121, a search condition obtaining unit 104a, a substitute word obtaining unit 105, and an output unit 106.

In other words, the associated word presentation device 100b according to this Variation includes the search condition obtaining unit 104a instead of the search condition obtaining unit 104 compared with the related word presentation device 100 in the Embodiment, and further includes a program selecting unit 121.

The program selecting unit 121 displays a list of programs indicated in the program information 11a of the program information storage unit 101. When the user selects one of the programs from the list, the program selecting unit 121 outputs the so program ID of the selected program to the search condition obtaining unit 104a.

The search condition obtaining unit 104a obtains the program ID from the program selecting unit 121, and extracts the pairs of a word and its attribute corresponding to the program ID from the program information 101a of the program information storage unit 101. Subsequently, the search condition obtaining unit 104a estimates, for the user, an appropriate search word and the attribute from among the extracted pairs of a word and its attribute.

For example, when the search condition obtaining unit 104a obtains several program IDs, and extracts several pairs of a word and its attribute from the program information 101a, it estimates, for the user; the words most frequently included in the several pairs of a word and its attribute and the attributes of the most frequent words as the appropriate search words and the attributes thereof.

FIG. 19 is a diagram showing a display screen displayed on the program selecting unit 121.

For example, as shown in FIG. 19, the program selecting unit 121 displays a list of the programs indicated in the program information 101a of the program information storage unit 101.

More specifically, the program selecting unit 121 displays programs (each including Broadcast date, Program name, The outline of the program), based on each Genre (such as Variety) of the meta data indicated by the program information 101a. In addition, when the program information 101a includes thumbnails of the respective programs, the program selecting unit 121 displays these thumbnails. In addition, the program selecting unit 121 displays the list of programs each assigned with a check box CB so that the user can select the program. Further, the program selecting unit 121 displays a start button SB which allows the search condition obtaining unit 104a to start the estimation of a search word.

When the user who views the display screen of the program selecting unit 121 finds out a current program in the list, the user operates the program selecting unit 121 to select the check box CB assigned with the program, and displays a check mark in the selected check box CB. Subsequently, the user selects the start button SB.

As a result, the program selecting unit 121 outputs, to the search condition obtaining unit 104a, program IDs such as the program IDs "01" and "10" corresponding to the programs each assigned with a check box CB with a check mark displayed.

The search condition obtaining unit 104a obtains the program IDs "01" and "10" outputted from the program selecting unit 121 as described above. Subsequently, the search condition obtaining unit 104a obtains, from the program information storage unit 101, the pairs of a word and its attribute corresponding to the program ID "01" that are "Taro Matsushita/Person's name, Variety/Genre, Saburo Matsushita/Person's name, Japan/Name of country or place, Guest/Occupation, and Talk/Genre", and the pairs of a word and its attribute corresponding to the program ID "10" that are "Taro Matsushita/Person's name, Variety/Genre, and The World/Name of country or place".

When the search condition obtaining unit 104a obtains such two sets of pairs of a word and its attribute, for example, it estimates, for the user, "Taro Matsushita/Person's name" or "Variety/Genre" which are the words most frequently included in the pairs of a word and its attribute as the appropriate search words and the attributes thereof.

In this Variation, the program selecting unit 121 specifies several programs selected by the user from among the several programs indicated in the program information 101a. In addition, the search condition obtaining unit 104 obtains, as the search word, one of the several words according to the appearance frequencies of the several words used in the program information 101a to indicate the contents of the several programs specified by the program selecting unit 121, and specifies the attribute of the search word.

Accordingly, in this Variation, since the search words and the attributes thereof are estimated based on the programs selected by the user, it is possible to present substitute words related to the program which is currently being focused by the user by selecting the current program without an user's input of the search word.

In this Variation, the search condition obtaining unit 104a estimates search words based on the programs selected by the user from among the several programs indicated in the program information 101a, but it is to be noted that it may estimate search words based on the programs selected by the user from among the several programs included in the search results by the program search device.

For example, the program search device causes the output unit 106 to display, as search results, a list of programs as shown in FIG. 19. Subsequently, when the user selects several check boxes displayed on the list, the output unit 106 obtains, from the program information 101a, the program IDs of the programs having the selected check boxes and outputs them to the search condition obtaining unit 104a. The search condition obtaining unit 104a estimates search words using the program IDs and the program information 101a in a manner similar to the above.

(Variation 3)

Here, Variation 3 of this Embodiment is described.

Likewise the related word presentation device 100a in Variation 1, the related word presentation device according to this Variation presents narrow-down words and substitute words, and changes the ratio (word ratio) of the narrow-down words and substitute words to be presented, depending on the number of programs searched out based on a search condition.

Figure 20:
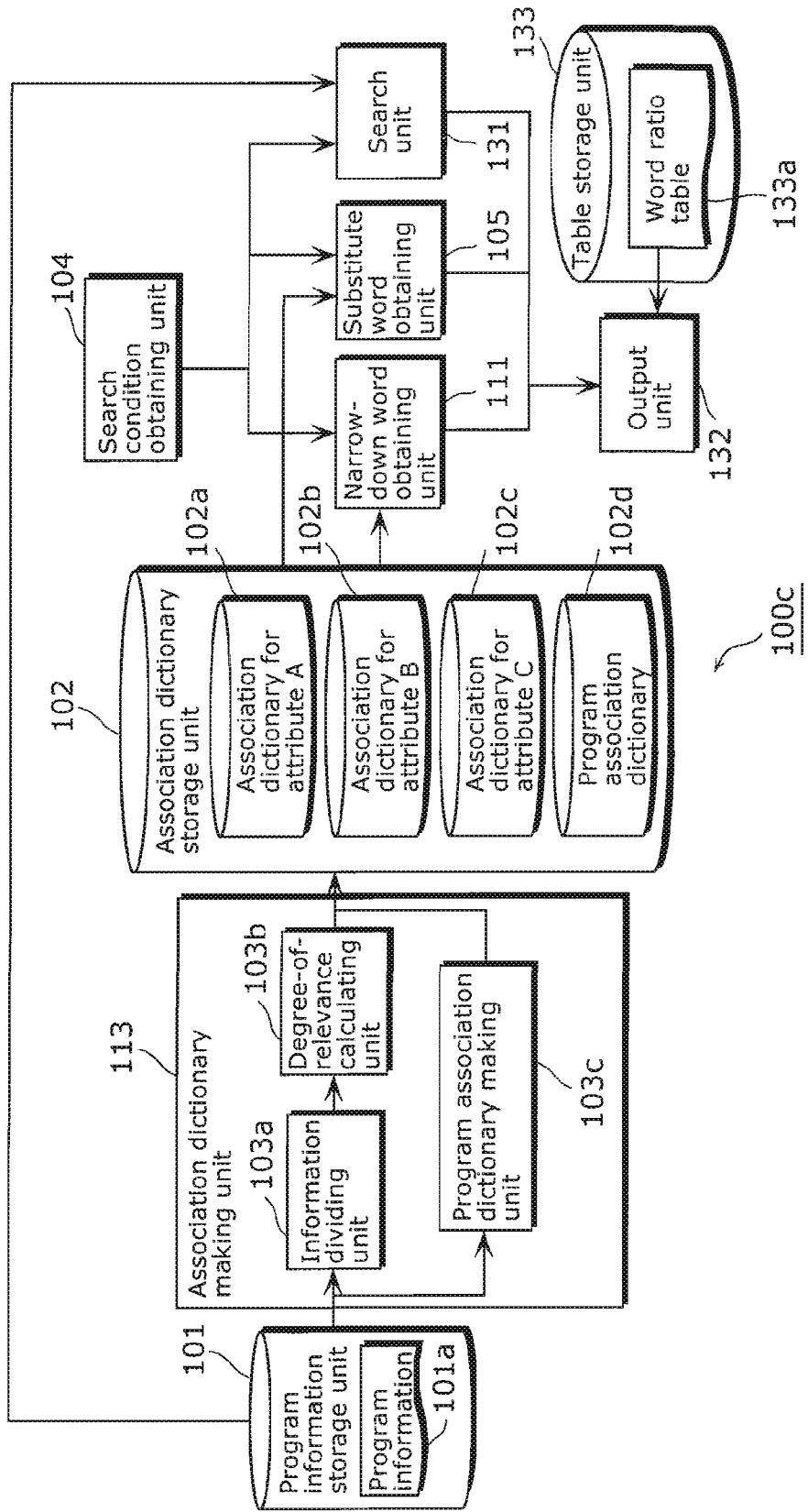
FIG. 20 is a block diagram showing the structure of a related word presentation device in Variation 3 of the Embodiment.
Figure 24:
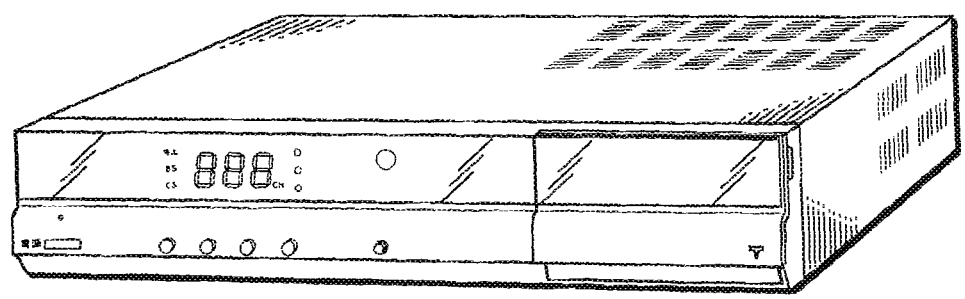
FIG. 24 is a diagram showing the appearance of a device as an application example of the related word presentation device in the Embodiment.

FIG. 20 is a block diagram showing the structure of the related word presentation device according to this Variation.

The related word presentation device 100c according to this Variation includes, a program information storage unit 101, an association dictionary making unit 113, an association dictionary storage unit 102, a search condition obtaining unit 104, a narrow-down word obtaining unit 111, a substitute word obtaining unit 105, a search unit 131, a table storage unit 133, and an output unit 132.

In other words, the related word presentation device 100c according to this Variation includes an output unit 132 instead of the output unit 106 compared with the related word presentation device 100a according to Variation 1, and further includes a search unit 131 and a table storage unit 133.

The search unit 131 searches out the programs including, in pairs of a word and its attributes, the search words obtained by the search condition obtaining unit 104 from the program information 101a of the program information storage unit 101, and outputs the number of the searched-out programs to the output unit 132.

The table storage unit 133 stores a word ratio table 133a. The word ratio table 133a shows, as word ratios, the ratios of the number of the narrow-down words and the number of substitute words to be presented to the user, depending on the number of programs searched out by the search unit 131.

Mores specifically, the word ratio table 133a indicates that the number of the narrow-down words to be presented to the user should be greater than the number of the substitute words when a great number of programs is searched out by the search unit 131, while the word ratio table 133a indicates that the number of the narrow-down words to be presented to the user should be smaller than the number of the substitute words when a smaller number of programs is searched out by the search unit 131.

The output unit 132 obtains several narrow-down words and substitute words outputted from the narrow-down word obtaining unit 111 and the substitute word obtaining unit 105, the number of programs outputted by the search unit 131, and the word ratio table 133a stored in the table storage unit 133.

Subsequently, the output unit 132 specifies the word ratios based on the number of the programs outputted by the search unit 131 with reference to the word ratio table 133a. The output unit 132 selects the narrow-down words and substitute words in an ascending order of magnitude of the degrees of relevance from among the several narrow-down words and substitute words outputted by the narrow-down word obtaining unit 111 and the substitute word obtaining unit 105 in accordance with the word ratios specified as described above.

FIG. 21 is a diagram indicating an example of the word ratio table 133a.

For example, as shown in FIG. 21, the word ratio table 133a shows the number of programs searched out by the search unit 131 (the number of search results) and the word ratios in an associated manner.

For example, the word ratio table 133a shows: a case where the number of search results is 1000 or more, wherein the word ratio "the number of narrow-down words:the number of substitutes words=8:2 is shown; and a case where the number of search results is not less than 500 and not greater than 100, wherein the word ratio "the number of narrow-down words: the number of substitutes words=6:4 is shown". In addition, the word ratio table 133a shows: a case where the number of search results is not less than 50 and not greater than 500, wherein the word ratio "the number of narrow-down words: the number of substitutes words=4:6 is shown; and a case where the number of search results is 50 or less, wherein the word ratio "the number of narrow-down words:the number of substitutes words=2:8 is shown".

For example, when the search unit 131 obtains "Conte/Genre" as the search word and the attribute thereof outputted by the search condition obtaining unit 104, it searches out the programs including "Conte/Genre" from the program information storage unit 101. At this time, when the search unit 131 finds out two-thousand programs, it outputs the number of search results "2000" which is the number of the programs to the output unit 132.

When the output unit 132 obtains the number of search results "2000" from the search unit 131, it identifies the word ratio of "8:2" corresponding to the number of search results "2000" with reference to the word ratio table 133a.

As a result, the output unit 132 selects the narrow-down words and substitute words in an ascending order of magnitude of the degrees of relevance from among the several narrow-down words and substitute words outputted by the narrow-down word obtaining unit 111 and the substitute word obtaining unit 105 in accordance with the identified word ratio "8:2".

It the above example, the word ratio table 133a shows the number of search results and the word ratio in an associated manner, but it is to be noted that the percentage of the number of search results with respect to the number of all programs may be indicated instead of the number of search results.

FIG. 22 is a diagram indicating an example of the word ratio table 133a.

The word ratio table 133a shown in FIG. 22 shows the percentages of the numbers of search results with respect to the number of all programs, and the word ratios. Here, the number of all programs is the number of all the programs indicated in the program information 101a in the program information storage unit 101.

For example, the word ratio table 133a shows: a case where the percentage of the number of search results with respect to the number of all programs is not less than 0.75 and not greater than 1.0, wherein the word ratio "the number of narrow-down words:the number of substitutes words=8:2 is shown; and a case where the percentage of the number of search results with respect to the number of all programs is not less than 0.5 and not greater than 0.75, wherein the word ratio "the number of narrow-down words:the number of substitutes words=6:4" is shown.

In addition, in the above example, the word ratio table 133a shows the numbers of search results and the word ratios in an associated manner, but the numbers of narrow-down words and the numbers of substitute words may be shown instead of the word ratios.

FIG. 23 is a diagram indicating yet another example of the word ratio table 133a.

The word ratio table 133a shown in FIG. 23 shows the number of search results, the number of narrow-down words, and the number of substitute words.

For example, the word ratio table 133a shows: a case where the number of search results is not less than 1000, wherein the number of narrow-down words is 8 or less and the number of substitute words is 2 or less; and a case where the number of search results is not less than 500 and not greater than 1000, wherein the number of narrow-down words is 6 or less and the number of substitute words is 4 or less.

In this Variation, when a great number of search results is obtained, a greater number of narrow-down words is displayed compared with substitute words, thereby allowing the user to easily select appropriate narrow-down words. As a result, the selection of the narrow-down words allows the program search device to reduce the number of programs as search results by executing the narrow-down search using the search word and the narrow-down words. In addition, when a smaller number of search results is obtained, a greater number of substitute words is displayed compared with narrow-down words, thereby allowing the user to easily select appropriate substitute words. As a result, the selection of the substitute words allows the program search device to increase the number of programs as search results by executing omission prevention search using the search word and the substitute words. In other words, in this Variation, it is possible to present related words (narrow-down words or substitute words) in accordance with the user's search actions.

The related word presentation device according to the present invention has been described with reference to the Embodiment and the Variations thereof up to this point, but the present invention is not limited to these.

For example, in the above Embodiment and the Variations thereof, when the search condition obtaining unit 104 obtains the search word and the attribute thereof, the substitute word obtaining unit 105 obtains, as substitute words, the words each having a degree of relevance not less than a threshold value with the search word from among the attribute-based association dictionary for the attribute of the search word. However, the substitute word obtaining unit 105 may obtain, as substitute words, only the words each having a degree of relevance not less than the threshold value with the search word and having the same attribute as that of the search word from the attribute-based association dictionary.

For example, when the search condition obtaining unit 104 obtains "Hanako Matsushita/Person's name" as the search word and the attribute thereof, the substitute word obtaining unit 105 obtains, as substitute words, the word "Shiro Matsushita" having a degree of relevance not less than the threshold value (for example, 0.6) with the "Hanako Matsushita" and having the same attribute "Person's name" which is also the attribute of the search word "Hanako Matsushita" from the attribute-based association dictionary for an attribute B 102b for the attribute "Person's name" shown in FIG. 8.

This allows the user to obtain, as substitute words, only the words belonging to the current attribute which is currently being focused on by the user, and to easily determine whether or not each of the presented substitute words is appropriate as the next search word because the substitute words belong to the attribute to which the search word belongs.

For example, when the user inputs "Rokuro Matsushita/Person's name" in the program search device with an aim to search out programs based on the cast of the programs, the user may not be satisfied with the search results obtained by the input. Assume a case where a word "The Word" belonging to an attribute "Name of country or place" and a word "Quiz" belonging to an attribute "Genre" which have attributes different from the attribute "Person's name" of the search word are presented as substitute words. In this case, since the attributes of the presented substitute words are different form the attribute "Person's name" of a possible search word which the user wishes to input, the user has difficulty in predicting the search results obtained if "The World" or "Quiz" is inputted to the program search device as the next search word(s). As a result, it becomes difficult for the user to easily select the presented substitute words. To prevent this, words "Shichiro Matsushita", "Hachiro Matsushita" and the like which belong to the attribute "Person's name" which is the attribute of the search word are presented as substitute words as described above, thereby allowing the user to easily determine which one of the substitute words should be selected as the search word next to the search word "Rokuro Matsushita".

For example, in the above Embodiment and Variations, when the search condition obtaining unit 104 obtains the search word and the attribute thereof, the substitute word obtaining unit 105 obtains, as substitute words, the words each having a degree of relevance with the search word not less than a threshold value from among the attribute-based association dictionary for the attribute of the search word. However, the substitute word obtaining unit 105 may obtain, as substitute words (the third related words) each having a degree of relevance not less than the threshold value with the search word from the attribute-based association dictionary for the attribute, for each of search words and their attributes obtained in a predetermined past period in which the search words and their attributes were obtained.

In this case, the related word presentation device includes a search condition storage unit for storing search words and their attributes obtained by the search condition obtaining unit 104. Each time of obtainment of a search word and the attribute thereof, the search condition obtaining unit 104 stores it in the search condition storage unit, and deletes the search word and the attribute stored in the search condition storage unit prior to the predetermined period in which they are stored.

Subsequently, the substitute word obtaining unit 105 obtains, as substitute words, words each having a degree of relevance not less than the threshold value with the search word from the attribute-based association dictionary for the attribute of the search word, for each of the search words and their attributes stored in the search condition storage unit as described above.

For example, the search condition obtaining unit 104 obtains "Variety/Genre" as the search word and its attribute, subsequently obtains "Taro Matsushita/Person's name", and stores them in the search condition storage unit. Subsequently, the substitute word obtaining unit 105 first obtains, as substitute words, words each having a degree of relevance not less than the threshold value with the search word "Variety" from the attribute-based association dictionary for an attribute A 102a for the attribute "Genre" of the search word "Variety", and obtains, as substitute words, words each having a degree of relevance not less than the threshold value with the search word "Taro Matsushita" from the attribute-based association dictionary for an attribute B 102b for the attribute "Person's name" of the search word "Taro Matsushita". As a result, the output unit 106 displays the substitute words obtained from the attribute-based association dictionary for an attribute A 102a and the substitute words obtained from the attribute-based association dictionary for an attribute B 102b.

With this, in the case where the user thinks a past search word more attractive than a recently inputted search word and is not satisfied with the search results and the substitute words obtained using the recently inputted search word, the user can select substitute words for a more attractive search word without returning to the display screen presenting substitute words for the more attractive past search word. In other words, since not only the substitute words for the recent search words but also the substitute words for the past search word are presented, the user can easily select substitute words for the more attractive search word.

In the above example, each time of obtainment of a search word and the attribute thereof, the search condition obtaining unit 104 stores them in the search condition storage unit, and deletes the search word and the attribute stored in the search condition storage unit prior to the predetermined period in which they are stored. However, the search condition obtaining unit 104 may store the obtained search words and the attributes thereof in the search condition storage unit by handling the contents in the search condition storage unit based on First-In First-Out (FIFO) where a predetermined number of search words and the attributes are stored according to the order of obtainment.

In addition, in Variation 1 and Variation 3, the narrow-down word obtaining unit 111 obtains, as narrow-down words, words each having a degree of relevance not less than the threshold value with the search word obtained by the search condition obtaining unit 104 from the program association dictionary 102d. However, the narrow-down word obtaining unit 111 may obtain, as narrow down words, only words each having a degree of relevance not less than the threshold value with the search word and having an attribute different from the attribute of the search word from the program association dictionary 102d.

As an example, the search condition obtaining unit 104 obtains the search word "Hanako Matsushita" and the attribute "Person's name". With reference to the program association dictionary 102d shown in FIG. 16, the narrow-down word obtaining unit 111 obtains, as the narrow-down word, a word "Information" belonging to an attribute different from the attribute "Person's name" of the search word from among the word "Information" and the attribute "Genre" and the word "Jiro Matsushita" and the attribute "Person's name" each having a degree of relevance not less than the threshold value (for example, 0.6) with the search word "Hanako Matsushita".

In this way, the user can easily select the next search word which allows narrow-down of the search results based on an aspect (attribute) different from that of the search word when too many search results is provided by the program search device based on the search word from among the narrow-down words presented by the related word presentation device. In other words, since there is no presentation of narrow-down words which contradict in concept with the search word, the user can easily select the next search word to narrow down the search results as expected by the user from among the presented narrow-down words.

For example, the user wishes to view the program in which "Shichiro Matsushita" appears and inputs "Shichiro Matsushita/Person's name" as a search word and the attribute thereof. As a result, a huge number of programs is displayed on the program search device.

In this case, when "Rokuro Matsushita/Person's name" and "Hachiro Matsushita/Person's name" are presented as the narrow-down words and the attributes thereof, it is difficult for the user to predict search results when either the former narrow-down words or the latter narrow-down words are selected as the next search words and narrow-down search is executed because the attribute "Person's name" of the presented narrow down words is the same as that of the search word inputted by the user. To sum up, the user has difficulty in selecting either the former narrow-down words or the latter narrow-down words.

However, what are presented when words belonging to attributes different from the attribute of the search word are presented as described above are narrow-down words "Drama" and "Variety" belonging to the attribute "Genre" and a narrow-down word "Kansai" belonging to the attribute "Name of country and place" each of which is related to the search word and the attribute "Shichiro Matsushita/Person's name" and has an attribute different from the attribute "Person's name". Accordingly, since the narrow-down words each having an attribute different from that of the search word, the user can easily predict the search results when the presented narrow-down words are selected as search words and narrow-down search is executed, and can easily select narrow-down words.

In addition, in the Embodiment and the Variation thereof, the search condition obtaining unit 104 obtains a search word and the attribute directly from the user, but it may obtain only the search word. In this case, the search condition obtaining unit 104 holds, for each word, a table indicating the attribute of the word. Subsequently, when the search condition obtaining unit 104 obtains the search word according to a user's input operation, it searches out the attribute associated with the search word from the table, and outputs the searched-out attribute and the search word to the substitute word obtaining unit 105 and the like. In this way, labor in user's input operation can be reduced.

A related word presentation device according to the present invention is capable of presenting, to a user, words which appear in a program different form a program in which a search word inputted by the user appears and have meaning similar to that of the search word. For example, the related word presentation device is applicable to hard disk recorders, DVD recorders, audio components, terminals which allow viewing of the program by accessing the Internet, server devices which provide services, and the like.

The invention claimed is:

1. A related word presentation device which generates association dictionaries, each association dictionary including words and degrees of relevance between the words, the related word presentation device comprising:
 a computer configured to operate as:
 a program information storage unit in which program information is stored, the program information being information indicating, for each program among programs contents of each program using words;
 a classifying unit configured to generate groups for each attribute among attributes of the words included in the program information, each of the groups being made for a reference word, each reference word being among reference words included in each attribute, each of the groups including (i) a corresponding one of the reference words and (ii) a set of words which co-occur with the corresponding one of the reference words in the program information including the corresponding one of the reference words;

a first degree-of-relevance calculating unit configured to store the association dictionaries for the respective attributes, the association dictionaries each including (i) a possible pair of words in the groups of a corresponding one of the attributes of the words and (ii) the degree of relevance between the words in the possible pair, a value of the degree of relevance becoming greater with an increase in the number of the groups of the corresponding one of the attributes of the words including the possible pair of words in a same group;

an obtaining unit configured to obtain a search word and an attribute of the search word;

a first related word selecting unit configured to select, as a first related word, a word related to the search word obtained by the obtaining unit from a corresponding association dictionary for the attribute obtained by the obtaining unit from among the association dictionaries for the respective attributes; and a presenting unit configured to present the first related word selected by the first related word selecting unit.

2. The related word presentation device according to claim 1, wherein each of the association dictionaries for the respective attributes stored in the first degree-of-relevance calculating unit indicates a unique association of the possible pair of words and a degree of relevance between the words in the possible pair.

3. The related word presentation device according to claim 1, wherein the classifying unit configured to remove the corresponding one of the reference words in the group from among words in the group which co-occur in the program.

4. The related word presentation device according to claim 1, wherein the first degree-of-relevance calculating unit is configured to calculate the degree of relevance between the words in the possible pair according to a frequency of co-occurrence of the words in the possible pair in each of the groups generated by the classifying unit, and generate the association dictionary which indicates the possible pair of words and the degree of relevance between the words in the possible pair in an associated manner.

5. The related word presentation device according to claim 4, wherein the first related word selecting unit is configured to preferentially select a word having a greatest degree of relevance with the search word obtained by the obtaining unit as the first related word from the association dictionary for the attribute obtained by the obtaining unit.

6. The related word presentation device according to claim 5, further comprising:

a degree-of-relevance calculating unit configured to calculate a degree of relevance between the possible pair of words according to a frequency of co-occurrence of the possible pair of words in each program indicated in the program information, generate the program association dictionary which indicates the possible pair of words and the degree of relevance between the words in the possible pair in an associated manner, and store the association dictionary in a dictionary storage unit; and a second related word selecting unit configured to preferentially select a word having a greatest degree of relevance with the search word obtained by the obtaining unit as a second related word from the corresponding one of the program association dictionaries stored in the dictionary storage unit, wherein the presenting unit is configured to further present the second related word selected by the second related word selecting unit.

7. The related word presentation device according to claim 6, wherein the second related word selecting unit is configured to select, as the second related word, only a word having an attribute different from the attribute of the search word obtained by the obtaining unit.

8. The related word presentation device according to claim 6, further comprising a search unit configured to search out, from the program information, a program whose contents are shown using the search word obtained by the obtaining unit, wherein the first and second related word selecting units select first related words and second related words, respectively, and the presenting unit is configured to present a greater number of the second related words than the first related words when a greater number of programs is searched out by the search unit, and present a greater number of the first related words than the second related words when a smaller number of programs is searched out by the search unit.

9. The related word presentation device according to claim 5, wherein the obtaining unit is configured to obtain the search word and the attribute of the search word in response to an input operation by the user.

10. The related word presentation device according to claim 5, further comprising;

a program selecting unit configured to identify programs selected by a user from among the programs indicated in the program information, wherein the obtaining unit is configured to obtain a single word as the search word from among the words according to a frequency of appearance of the words used in the program information to indicate the contents of the programs identified by the program selecting unit.

11. The related word presentation device according to claim 5, wherein the first related word selecting unit is configured to select, as the first related word, only a word having an attribute identical to an attribute of the search word obtained by the obtaining unit.

12. The related word presentation device according to claim 5, wherein the first related word selecting unit is configured to further select a word having a greater degree of relevance with another search word as a third related word from the association dictionary for the attribute of the other search word in the case where the other search word and the attribute of the other search word have been obtained in a predetermined period prior to the obtainment of the search word by the obtaining unit, and the presentation unit further presents the third related word obtained by the first related word selecting unit.

13. A related word presentation method for generating association dictionaries, each association dictionary including words and degrees of relevance between the words, and presenting a related word related to a search word using a corresponding one of the association dictionaries, the related word presentation method comprising:

generating groups for each attribute among attributes of the words included in the program information, each of the groups being made for a reference word, each word being among reference words included in each attribute, each of the groups including (i) a corresponding one of the reference words and (ii) a set of words which co-occur with the corresponding one of the reference words in the program information including the corresponding one of the reference words, using a non-transitory program information storage unit in which the program information is stored, the program information being information indicating, for each of programs, contents of the program using words;

storing the association dictionaries for the respective attributes, the association dictionaries each including (i) a possible pair of words in the groups of a corresponding one of the attributes of the words and (ii) the degree of relevance between the words in the possible pair, a value of the degree of relevance becoming greater with an increase in the number of the groups of the corresponding one of the attributes of the words including the possible pair of words in a same group;

obtaining a search word and an attribute of the search word;

selecting, as a related word, a word related to the search word obtained in the obtaining from a corresponding association dictionary for the attribute obtained in the obtaining from among the association dictionaries for the respective attributes; and presenting the related word selected in the selecting.

14. A non-transitory computer-readable recording medium storing a program for generating association dictionaries, each association dictionary including words and degrees of relevance between the words, and presenting a related word related to a search word using a corresponding one of the association dictionaries, the program causing a computer to execute steps comprising:

generating groups for each attribute among attributes of the words included in the program information each of the groups being made for a reference word, each reference word being among reference words included in each attribute, each of the groups including (i) a corresponding one of the reference words and (ii) a set of words which co-occur with the corresponding one of the reference words in the program information including the corresponding one of the reference words, using a program information storage unit in which the program information is stored, the program information being information indicating, for each of programs, contents of the program using words;

storing the association dictionaries for the respective attributes, the association dictionaries each including (i) a possible pair of words in the groups of a corresponding one of the attributes of the words and (ii) the degree of relevance between the words in the possible pair, a value of the degree of relevance becoming greater with an increase in the number of the groups of the corresponding one of the attributes of the words including the possible pair of words in a same group;

obtaining a search word and an attribute of the search word;

selecting, as a related word, a word related to the search word obtained in the obtaining from a corresponding association dictionary for the attribute obtained in the obtaining from among the association dictionaries for the respective attributes; and presenting the related word selected in the selecting.

* * * * *